US012715790B2

(12) United States Patent
Hirsch et al.

(10) Patent No.: US 12,715,790 B2
(45) **Date of Patent: *Aug. 25, 2026**

(54) PURE WATER SYSTEMS

(71) Applicant: Unger Marketing International, LLC, Bridgeport, CT (US)

(72) Inventors: Kai Hirsch, Cologne (DE); Paul Adams, Monroe, CT (US); Anthony Sgroi, Jr., Wallingford, CT (US); Bryan Lee Roberts, Jr., Dormagen (DE); Robert Camp, Bethany, CT (US); Michael Blum, Wuppertal (DE)

(73) Assignee: UNGER MARKETING INTERNATIONAL, LLC, Bridgeport, CT (US)

( * ) Notice: Subject to any disclaimer, the term of this patent is extended or adjusted under 35 U.S.C. 154(b) by 275 days.

This patent is subject to a terminal disclaimer.

(21) Appl. No.: 16/571,342

(22) Filed: Sep. 16, 2019

(65) Prior Publication Data

US 2020/0010338 A1 Jan. 9, 2020

Related U.S. Application Data

(63) Continuation of application No. 14/684,071, filed on Apr. 10, 2015, now Pat. No. 10,414,671.

(Continued)

(51) Int. Cl.

*C02F 1/42* (2023.01)
*B01D 15/36* (2006.01)

(Continued)

(52) U.S. Cl.

CPC .............. *C02F 1/42* (2013.01); *B01D 15/361* (2013.01); *B01D 35/1475* (2013.01);

(Continued)

(58) Field of Classification Search

USPC .................................................. 210/289, 436

See application file for complete search history.

(56) References Cited

U.S. PATENT DOCUMENTS 106,530 A * 8/1870 Fleischmann ........ B01D 24/165 210/277
405,518 A 6/1889 Wilson (Continued)

FOREIGN PATENT DOCUMENTS

CA 2964732 A1 10/2015
CH 351907 A 1/1961

(Continued)

OTHER PUBLICATIONS

Canadian Office Action for Application No. 2,964,732 dated Dec. 17, 2019; 5 pgs.

(Continued)

*Primary Examiner* — Robert J Popovics
(74) *Attorney, Agent, or Firm* — McCarter & English, LLP; Dave S. Christensen

(57) ABSTRACT

Modular pure water systems are provided that have a tank and a cover assembly, wherein the tank and cover assembly are configured to removably receive therebetween one or more expansion tubes in a fluid tight manner to allow for selective volume expansion of the pure water system. Also provided are purification media bags for pure water systems that have a shape, construction, and/or material that mitigates the flow of water between the outer wall of the bag and an inner wall of the pure water systems.

16 Claims, 22 Drawing Sheets

Related U.S. Application Data

(60) Provisional application No. 62/065,803, filed on Oct. 20, 2014, provisional application No. 61/977,778, filed on Apr. 10, 2014.

(51) Int. Cl.

| | |
|---|---|
| ***B01D 24/04*** | (2006.01) |
| ***B01D 24/16*** | (2006.01) |
| ***B01D 35/147*** | (2006.01) |
| ***B01D 35/30*** | (2006.01) |
| ***B01J 47/012*** | (2017.01) |
| ***B01J 47/024*** | (2017.01) |
| ***B08B 3/14*** | (2006.01) |
| ***C02F 1/00*** | (2023.01) |
| ***C02F 103/02*** | (2006.01) |

(52) U.S. Cl.

CPC ........... *B01J 47/012* (2017.01); *B01J 47/024* (2013.01); *C02F 1/001* (2013.01); *B01D 24/042* (2013.01); *B01D 24/165* (2013.01); *B01D 35/303* (2013.01); *B01D 2201/306* (2013.01); *B01D 2201/4015* (2013.01); *B01D 2201/4076* (2013.01); *B08B 3/14* (2013.01); *C02F 1/002* (2013.01); *C02F 2001/427* (2013.01); *C02F 2103/02* (2013.01); *C02F 2201/006* (2013.01); *C02F 2201/007* (2013.01); *C02F 2201/008* (2013.01)

(56) References Cited

U.S. PATENT DOCUMENTS 429,384 A 6/1890 Manwaring
661,339 A 11/1900 Grever
1,211,369 A 1/1917 Miller
1,527,046 A 2/1925 Ingram
1,656,896 A * 1/1928 Astrom .................... C02F 1/42 210/275
2,063,086 A 12/1936 Fitz Gerald
2,073,991 A 3/1937 Koser
2,087,157 A * 7/1937 Lind ........................ B01J 49/10 141/2
2,098,903 A * 11/1937 Slidell ...................... C02F 1/42 210/291
2,117,091 A * 5/1938 Gudmundsen ......... B01J 47/012 210/282
2,167,225 A 7/1939 Van Eweyk
2,270,969 A * 1/1942 Robinson .............. B01D 27/08 210/418
2,278,488 A 4/1942 Ralston
2,295,708 A 9/1942 Raymond
2,365,221 A 12/1944 Shafor
2,367,260 A 1/1945 Beddoes
2,525,497 A 10/1950 Monfried
2,593,227 A * 4/1952 Wagner ................. B01D 35/18 210/450
2,630,227 A 3/1953 Rodwell
2,717,614 A 9/1955 Palivos
2,753,302 A 7/1956 Cioffi
3,094,043 A 6/1963 Powers et al.
3,094,807 A 6/1963 Dorman
D198,153 S 5/1964 Baker
3,209,915 A 10/1965 Gutkowski
3,266,628 A 8/1966 Price
3,283,903 A 11/1966 Muller
3,319,794 A 5/1967 Gross
3,327,859 A 6/1967 Pall
3,342,340 A 9/1967 Shindell
3,371,792 A 3/1968 Weyand et al.
3,402,126 A 9/1968 Cioffi
3,442,390 A * 5/1969 Petrucci et al. ..... B01D 36/001 210/323.2
3,497,069 A 2/1970 Lindenthal et al.
3,517,816 A 6/1970 Hoppen
3,561,602 A 2/1971 Molitor
3,642,213 A 2/1972 Parkison et al.
3,746,171 A 7/1973 Thomsen
3,807,298 A 4/1974 Luke et al.
3,951,811 A * 4/1976 Casolo .................. B01D 24/04 210/281
3,960,092 A 6/1976 Newman, Jr.
4,005,010 A 1/1977 Lunt
4,048,030 A 9/1977 Miller
4,048,064 A 9/1977 Clark, III
4,049,548 A * 9/1977 Dickerson ............. B01J 47/012 210/96.1
4,093,548 A * 6/1978 Sterkenburg ......... B01D 24/165 210/350
4,102,473 A 7/1978 Draxler
4,178,249 A * 12/1979 Councill ............... B01D 24/12 210/281
4,272,263 A 6/1981 Hancock
4,368,123 A 1/1983 Stanley
4,418,924 A 12/1983 Mack
D281,755 S 12/1985 Bradley
4,654,140 A 3/1987 Chen
4,659,460 A * 4/1987 Muller .................. B01D 15/00 210/93
4,728,422 A 3/1988 Bailey
4,793,922 A 12/1988 Morton
4,795,173 A 1/1989 Osborne
4,877,526 A 10/1989 Johnson et al.
4,882,050 A 11/1989 Kopf
4,885,089 A 12/1989 Hankammer
4,932,915 A 6/1990 Boris et al.
4,989,636 A 2/1991 Hunter et al.
5,006,238 A 4/1991 Tominaga
5,040,903 A 8/1991 Schramer
D320,273 S 9/1991 Heiden
5,064,534 A 11/1991 Busch
5,087,357 A 2/1992 Villa
5,100,551 A 3/1992 Pall et al.
D326,002 S 5/1992 Rodriguez
5,112,503 A 5/1992 Raifman
5,114,572 A 5/1992 Hunter et al.
5,137,632 A 8/1992 Morgan, Jr.
5,154,823 A 10/1992 Ma et al.
5,236,595 A 8/1993 Wang et al.
5,254,242 A 10/1993 van der Meer
5,288,412 A 2/1994 Voorhees et al.
5,318,703 A 6/1994 Heiligman
5,378,370 A 1/1995 Brane et al.
5,510,027 A 4/1996 Tejeda
D369,544 S 5/1996 Culliss
D372,760 S 8/1996 Brancazio
D374,064 S 9/1996 Brancazio
5,558,244 A 9/1996 Akaike et al.
5,566,611 A 10/1996 Scheucher et al.
5,595,652 A 1/1997 Rainer
5,605,624 A 2/1997 Wright
5,605,632 A 2/1997 Jansen
5,624,559 A 4/1997 Levin et al.
5,637,214 A 6/1997 Kahana
5,660,802 A * 8/1997 Archer .................... E03B 7/074 210/764
5,660,863 A 8/1997 Nakano et al.
D395,274 S 6/1998 Stoll
5,853,572 A 12/1998 Kuennen et al.
D404,086 S 1/1999 Harwell
5,876,600 A 3/1999 Matsubara et al.
D414,824 S 10/1999 Canoose
D416,790 S 11/1999 Bertozzi et al.
5,985,139 A 11/1999 Zoeller
5,993,656 A 11/1999 Cordani
6,009,728 A 1/2000 Kashiwagi et al.
6,068,761 A 5/2000 Yuen
D427,046 S 6/2000 Mannix
6,099,728 A 8/2000 Bairischer
6,120,686 A 9/2000 Bilz
6,132,612 A * 10/2000 Bourgeois ............... B01J 49/08 210/284
6,136,183 A 10/2000 Suzuki et al.

(56) References Cited

U.S. PATENT DOCUMENTS 6,197,193 B1 3/2001 Archer
D441,278 S 5/2001 Remar
D441,914 S 5/2001 Armour
6,241,389 B1 6/2001 Gilmore et al.
6,274,055 B1 8/2001 Zuk, Jr.
6,343,697 B1 2/2002 Hausdorf et al.
D455,935 S 4/2002 Detiveaux
6,391,097 B1 5/2002 Rosenberg
6,485,639 B1 11/2002 Gannon et al.
6,500,335 B2 12/2002 Janik et al.
6,610,275 B1 8/2003 Owades et al.
6,622,871 B2 9/2003 Gabele et al.
D481,442 S 10/2003 Liu
6,649,056 B2 11/2003 Fritze
6,685,843 B2 2/2004 Leaverton
6,716,348 B1 4/2004 Morgan
6,764,595 B1 7/2004 Halemba et al.
6,773,588 B2 8/2004 Beeman et al.
D496,984 S 10/2004 Costa
D506,551 S 6/2005 Booth et al.
6,966,444 B2 11/2005 Morgan
D517,162 S 3/2006 Clower
7,014,690 B2 3/2006 Mitsch et al.
7,147,774 B2 12/2006 Jones, III
7,156,994 B1 1/2007 Archer
7,186,338 B2 3/2007 Boisvert
7,243,728 B2 7/2007 Stoesz et al.
D552,248 S 10/2007 Brawley
7,297,257 B1 11/2007 Terry
7,303,605 B2 12/2007 Zia et al.
D562,431 S 2/2008 Brune
7,357,337 B2 4/2008 Farrari
7,378,019 B1 5/2008 Currier et al.
D580,205 S 11/2008 Callahan
7,459,078 B2 12/2008 Klein
7,566,399 B2 7/2009 Kuo et al.
D606,420 S 12/2009 Shoji
7,625,199 B2 12/2009 Jahn et al.
7,748,755 B2 7/2010 Camp et al.
7,850,859 B2 12/2010 Tanner et al.
7,963,400 B2 6/2011 Stolarik et al.
D640,933 S 7/2011 Gallagher
7,993,530 B2 * 8/2011 Horne .................... B01D 35/26 210/171
D649,477 S 11/2011 Burns
8,110,103 B2 2/2012 Mormino et al.
8,147,683 B2 * 4/2012 Wilson ............... B01D 35/1475 210/90
8,182,212 B2 5/2012 Parcell
D661,339 S 6/2012 Thixton et al.
8,323,493 B2 12/2012 Quintel et al.
D678,815 S 3/2013 Hernandez
8,393,262 B1 3/2013 Molayem
8,464,743 B2 * 6/2013 King .................. B65D 41/0485 137/15.08
D692,524 S 10/2013 Ziser
D700,063 S 2/2014 Torang
8,815,086 B2 8/2014 Morgan
D736,651 S 8/2015 Moad
D740,915 S 10/2015 Harrington
D742,997 S 11/2015 Sgroi, Jr.
9,279,237 B2 * 3/2016 Catt Lyon ............. B01D 29/03
D779,629 S 2/2017 Kemper
D796,628 S * 9/2017 Buckley ....................... D23/207
D797,888 S 9/2017 Schurmeyer
D798,996 S 10/2017 Sgroi
D804,596 S 12/2017 Nichols
D815,220 S 4/2018 Nichols
D828,488 S 9/2018 Sgroi
10,088,398 B2 10/2018 Clark et al.
D849,886 S * 5/2019 Buckley ....................... D23/207
10,307,712 B2 * 6/2019 Huda ................... B01D 15/361
D859,626 S 9/2019 Hu
10,414,671 B2 9/2019 Hirsch et al.
D861,847 S 10/2019 Li
D870,258 S 12/2019 Song
10,532,933 B2 * 1/2020 Bell ....................... B01D 29/27
10,549,239 B2 * 2/2020 Hirsch .................... C02F 1/008
10,717,046 B2 * 7/2020 Adams ................. B01D 61/025
10,829,396 B2 11/2020 Camp et al.
D907,742 S * 1/2021 Camp ........................... D7/400
D911,486 S 2/2021 Sgroi, Jr.
D913,413 S * 3/2021 Huda ........................... D23/207
D928,911 S * 8/2021 Huda ........................... D23/207
11,148,082 B2 * 10/2021 Huda ................. B01D 35/1475
11,154,800 B2 * 10/2021 Patterson ............... B01D 35/30
11,185,822 B2 * 11/2021 Hirsch ............... B01D 35/1435
11,369,923 B2 * 6/2022 Adams ................. B01D 15/361
D958,928 S * 7/2022 Patterson .................. C02F 3/00 D23/207
11,396,833 B2 * 7/2022 Scudder ............. F01M 11/0004
11,535,530 B2 * 12/2022 Camp ....................... C02F 1/42
11,686,227 B2 * 6/2023 Schiefer ................. B67D 7/845 210/416.4
11,739,004 B2 * 8/2023 Schmidt .................. C02F 1/006 210/241
11,806,647 B2 * 11/2023 Huda ..................... B01D 24/10
11,813,570 B2 * 11/2023 Adams ................. B01D 61/029
11,911,720 B2 * 2/2024 Adams ................... B01D 29/31
D1,028,169 S * 5/2024 Harrington .................. D23/225
12,017,942 B2 * 6/2024 Harrington ............. C02F 1/283
D1,057,081 S * 1/2025 Harrington .................. D23/225
12,246,913 B2 * 3/2025 Crossman .............. B65D 88/54
12,318,719 B2 * 6/2025 Adams ...................... C02F 9/20
2004/0084361 A1 5/2004 Janik et al.
2004/0140251 A1 7/2004 Hsiao
2004/0149666 A1 8/2004 Leaverton
2004/0251191 A1 12/2004 Darmawan
2005/0199536 A1 9/2005 Koslow
2006/0086656 A1 4/2006 Morgan
2007/0000829 A1 1/2007 Boisvert
2007/0235381 A1 10/2007 Tsai
2008/0000820 A1 1/2008 Mitchell
2008/0011669 A1 1/2008 Morgan
2008/0296210 A1 12/2008 Bittner
2009/0008318 A1 1/2009 Anes et al.
2009/0045583 A1 2/2009 Ropponen
2009/0146421 A1 6/2009 Engdahl
2009/0166273 A1 * 7/2009 Mormino .................. C02F 1/42 220/694
2009/0314703 A1 12/2009 Beach et al.
2010/0012590 A1 * 1/2010 Slark ......................... C02F 1/42 210/264
2010/0084030 A1 4/2010 Mackulin et al.
2010/0126946 A1 5/2010 Morgan
2010/0314301 A1 12/2010 Sloan et al.
2011/0024341 A1 * 2/2011 Lyon ......................... E03B 3/03 210/170.03
2011/0062065 A1 3/2011 Mccague
2011/0062066 A1 3/2011 Mccague
2011/0084070 A1 * 4/2011 Martheenal ............... E03B 3/03 220/200
2011/0089180 A1 4/2011 Kolbasi
2011/0303618 A1 12/2011 Cueman et al.
2012/0085687 A1 4/2012 Simonette
2012/0261325 A1 10/2012 Brown et al.
2012/0261329 A1 * 10/2012 Quintel ................ B01D 39/083 29/527.1
2012/0261359 A1 10/2012 Quintel et al.
2013/0020246 A1 1/2013 Hoots et al.
2013/0025447 A1 1/2013 Crowder
2013/0056406 A1 3/2013 Jacobs et al.
2013/0193047 A1 * 8/2013 Catt Lyon ................. E03B 3/02 210/170.03
2013/0277298 A1 10/2013 Sanocki et al.
2014/0027361 A1 1/2014 Pennington
2015/0107205 A1 4/2015 Hartog
2015/0353383 A1 * 12/2015 Hirsch ............... B01D 35/1475 210/323.1
2017/0136412 A1 * 5/2017 Huda ..................... B01D 61/12
2017/0137303 A1 * 5/2017 Hirsch .................... C02F 1/008
2017/0137304 A1 * 5/2017 Adams ................... B01D 61/04
2017/0197854 A1 7/2017 Chandler, Jr. et al.

(56) References Cited

U.S. PATENT DOCUMENTS

| | | | | |
|---|---|---|---|---|
| 2018/0071791 | A1* | 3/2018 | Hirsch | B08B 3/026 |
| 2018/0194646 | A1* | 7/2018 | Camp | B01J 47/024 |
| 2018/0272256 | A1* | 9/2018 | Bell | B01D 29/27 |
| 2019/0070535 | A1 | 3/2019 | Patterson | |
| 2019/0193006 | A1 | 6/2019 | Huda et al. | |
| 2020/0001214 | A1 | 1/2020 | Adams | |
| 2020/0010338 | A1* | 1/2020 | Hirsch | C02F 1/001 |
| 2020/0147549 | A1* | 5/2020 | Hirsch | B01D 61/025 |
| 2020/0384413 | A1* | 12/2020 | Adams | C02F 5/00 |
| 2021/0024380 | A1 | 1/2021 | Camp et al. | |
| 2021/0047222 | A1* | 2/2021 | Harrington | C02F 1/442 |
| 2021/0380434 | A1* | 12/2021 | Zhu | C02F 1/42 |
| 2022/0040640 | A1* | 2/2022 | Hirsch | C02F 1/008 |
| 2022/0062805 | A1* | 3/2022 | Huda | B01D 24/10 |
| 2022/0280898 | A1* | 9/2022 | Adams | B01D 61/025 |
| 2024/0123379 | A1* | 4/2024 | Adams | B01D 35/1475 |

FOREIGN PATENT DOCUMENTS

| | | | | | |
|---|---|---|---|---|---|
| CN | 105709492 | A | | 6/2016 | |
| DE | 2020929 | A1 | | 1/1972 | |
| DE | 2531850 | | | 1/1977 | |
| DE | 3207511 | A | * | 9/1983 | B01D 39/02 |
| DE | 3207511 | A1 | * | 9/1983 | B01D 39/02 |
| DE | 3624414 | | | 1/1988 | |
| DE | 4136852 | A1 | | 5/1993 | |
| DE | 4325114 | C1 | | 11/1994 | |
| DE | M97016860001 | | | 8/1997 | |
| DE | 69411911 | T2 | | 2/1999 | |
| DE | 20022322 | U1 | | 7/2001 | |
| DE | 10305632 | A1 | | 11/2003 | |
| DE | 202006002737 | U1 | | 4/2006 | |
| EM | 0003898380031 | | | 8/2005 | |
| EM | 0003898380032 | | | 10/2005 | |
| EP | 1221429 | A1 | | 11/1999 | |
| EP | 1626936 | A1 | | 2/2006 | |
| EP | 1728767 | A1 | | 12/2006 | |
| EP | 0676010 | B1 | | 7/2010 | |
| EP | 3056276 | A2 | | 8/2016 | |
| EP | 3070058 | A1 | | 9/2016 | |
| EP | 3372558 | A1 | | 9/2018 | |
| FR | 2636940 | A1 | | 3/1990 | |
| GB | 525643 | A | | 9/1940 | |
| GB | 1296051 | | | 3/1969 | |
| GB | 1404267 | | | 8/1975 | |
| GB | 1441269 | A | | 6/1976 | |
| GB | 1543590 | | | 4/1979 | |
| GB | 2206292 | A | | 1/1989 | |
| GB | 2222536 | A | | 3/1990 | |
| JP | H07163820 | A | | 6/1995 | |
| JP | H1190427 | | | 4/1999 | |
| JP | 2005138064 | A | | 6/2005 | |
| NL | 8204637 | | | 6/1984 | |
| WO | 2003064290 | A1 | | 8/2003 | |
| WO | 2004110938 | A2 | | 12/2004 | |
| WO | 2005115924 | A2 | | 12/2005 | |
| WO | 2010010574 | A1 | | 1/2010 | |
| WO | 2010081075 | | | 1/2010 | |
| WO | 2013103765 | A1 | | 7/2013 | |
| WO | 2015157680 | A1 | | 10/2015 | |
| WO | 2018067437 | A1 | | 4/2018 | |

OTHER PUBLICATIONS

Extended European Search report dated Jul. 17, 2020 for corresponding European Application No. 19210394.3, 9 pages.

Written Opinion of the International Searching Authority dated Jul. 9, 2015 for corresponding PCT/US15/25386, 8 pages.

Application for Invalidation dated Sep. 28, 2016 in European Community Registration EU 002555425-0002.

European Search Report dated Jan. 18, 2016 for corresponding European Patent Application No. 15776288.1, 8 pages.

Extended European Search Report dated Aug. 19, 2016 for corresponding European Patent Application No. 16164246.7, 8 Pages.

Extended European Search report dated May 9, 2016 for corresponding European Application No. 15776288.1, 14 pages.

Lustiges Taschenbuch No. 210 (front page, pp. 2, 3, 218, 219, 238, 239, 240, 241, published 1995).

Penquin Filter Pump Industries, "In-Tank & Out-Tank Filtration Systems", https://filterpump.com, Jul. 2010 (Jul. 2010)—refer to BF Bag Filtration Systems.

Walt Disney's Donald Duck No. 378 (Front page, p. 1; published 1987).

Walt Disney's Donald Duck No. 379 (Front Page, p. 1 and p. 73; published 1987).

Susan Selke: "Packaging: Polymers in Flexible Packaging", Encyclopedia of Materials: Science and Technology (Second Edition), Dec. 31, 2001 (Dec. 31, 2001), pp. 6652-6656, XP055742846, Retrieved from the Internet: URL:https://www.sciencedirect.com/sdfe/pdf/download/eid/3-s2.0-B0080431526011761/first-page-pdf [retrieved on Oct. 22, 2020].

Ask Mr Science, How do rainbows work, Oct. 2013, users.hubwest.com, blogpost, retrieved Feb. 6, 2020 from <URL:http://users.hubwest.com/hubert/mrscience/science17.html> (Year: 2013).

"Componenti Per Addolcitori/Water Softners Components," ITA/NIG-CAT-801, Dated Apr. 2009, 6 Pages.

International Search Report dated Jul. 9, 2015 for corresponsding PCT/US15/25386, 2 Pages.

"Annulus" Merriam-Webster.com, 2021 https://www.merriam-webster.com/dictionary/annulus (retrieved Jul. 21, 2021).

* cited by examiner 104
108
106
102

FLOW

FIG. 21C

FLOW

FLOW

FLOW 416-2
416-4b
482
416-1
496
34
92
416-4a
416

PURE WATER SYSTEMS

CROSS REFERENCE TO RELATED APPLICATIONS

This application is a continuation application of U.S. Pat. No. 10,414,671, issued on Sep. 17, 2019, entitled "Pure Water Systems," which is incorporated by reference in its entirety. U.S. Pat. No. 10,414,671, filed on Apr. 10, 2015, and assigned application Ser. No. 14/684,071, claims the benefit of U.S. Provisional Application Ser. No. 61/977,778, filed Apr. 10, 2014, and claims the benefit of U.S. Provisional Application Ser. No. 62/065,803, filed Oct. 20, 2014, the entire contents of both of which are incorporated by reference herein.

BACKGROUND OF THE INVENTION

1. Field of the Invention

The present disclosure is related to pure water systems. More particularly, the present disclosure is related to pure water systems that are modular, as well as cover assemblies and purification assemblies for such systems.

2. Description of Related Art

The use of pure water in various cleaning applications is well known. As used herein, the term "pure water" shall mean water that is filtered or otherwise processed to remove soluble and/or insoluble impurities such as, but not limited to minerals, salts, suspended particles, bacteria, and others.

Pure water shall include water processed by methods such as, but not limited to, distilling (i.e., distilled water), deionizing (DI water), reverse osmosis, desalination, carbon filtration, microfiltration, ultrafiltration, ultraviolet oxidation, electrodialysis, others, and any combinations thereof.

One common cleaning application for pure water is the cleaning of windows, cars, buildings, solar panels, and other surfaces. For example, the use of pure water in the form of deionized (DI) water, also known as demineralized (DM) water, has been found to be particularly effective when cleaning smooth or reflective surfaces such as metal, glass, ceramics, tile, marble, plastics, and others.

The pure water can reduce the formation water marks and spots, which can be formed by impurities in untreated water that remain on the surface when the water dries. Thus, cleaning with DI water can eliminate the need to dry or wipe the water from the surface (e.g. using a squeegee blade) without leaving water spots and can eliminate the need for any rinsing, cleaning chemicals, wiping, or drying.

Further and without wishing to be bound by any particular theory, the removal of ions from the DI water allows the water to attract and bind to the ions of dirt and other particles on the surface being cleaned, which can also eliminate the need for any cleaning chemicals.

Thus, the use of pure water in various forms can be used to improve cleaning performance, reduce cleaning effort (e.g., remove drying or wiping steps), reduce cost and/or time (e.g., eliminate expensive rinsing or cleaning chemicals), and other benefits.

Unfortunately, many prior art pure water systems are not scalable to different volumes. For example, many such pure water systems have purification media (i.e., filters, membranes, resin, and others) that allow for the purification of only a certain volume of water. In such instances, frequent replacement of the purification media is necessary when using a small volume system in a large volume cleaning application (e.g., large commercial building). Alternately, movement of a large volume system is necessary when using the system for a small volume cleaning application (e.g. a residential house).

Moreover, many prior art pure water systems make it difficult and time consuming to replace depleted or spent purification media—which also limits the productivity gains from such systems.

Accordingly, there is a need for water purification systems that overcome, alleviate, and/or mitigate one or more of the aforementioned and other deleterious effects of prior art.

SUMMARY

Modular pure water systems are provided that have a tank and a cover assembly, wherein the tank and cover assembly are configured to removably receive therebetween one or more expansion tubes in a fluid tight manner to allow for selective volume expansion of the pure water system. In some embodiments, the tank and the expansion tubes have a substantially common volume. For example, it is contemplated by the present disclosure for the tank and the expansion tubes to have a volume of about 6 liters.

Cover assemblies for pure water systems are provided that have a cap and a locking handle. The cap has a lower rim that engages a portion of the pure water system to form a water tight connection, while the locking handle has a plurality of bayonet-type slots that engage radial pins of the pure water system.

In some embodiments, the cover assemblies include release assemblies having pressure release plunger connected to a locking member by a pivoting lever so that a single movement of the lever simultaneously vents pressure and unlocks the cover assembly.

Filtration assemblies for pure water systems are provided that have at least one diffuser plate and a purification media disposed in a filter bag. The diffuser plate having an inner area with a plurality of fluid passage openings and an outer area that lacks such openings. In some embodiments, the outer area has an upstanding rim thereon, which is configured to engage the bag of the purification media. Of course, the rim can be integrated into the filter bag. In either embodiment, the rim assists in causing a tortious path for the water to flow radially outward along the interface of the filter bag and the diffuser plate—which can ensure flow of the water into the filter bag. In some embodiments, the filtration includes two diffuser plates, one disposed on opposite sides of the purification media. In some embodiments, the purification assembly includes a plurality of bags of the purification media, stacked one on another.

Purification media bags for pure water systems are provided that include materials and/or a shape that forms a sealing engagement to mitigate (i.e., minimize) the flow of water between the outer wall of the bag and an inner wall of the pure water systems.

As used herein, the terms "sealing engagement" and "sealingly engaged" shall mean the reduction or elimination of the flow of untreated water past various contacting surfaces such as, but not limited to, between the purification media and the inner surface of the tank, between the diffuser and the inner surface of the tank, between the media bag and the diffuser, and others. Stated another way the terms "sealing engagement" and "sealingly engaged" shall mean an engagement that provides a path of increased resistance between the contacting surfaces to optimize flow through the purification media.

In some embodiments, at least portions of the bags are made of elastomeric material. In some embodiments, the bags have a bottom panel that is seamless at least in areas where the bag is configured to interface with the diffuser plate. In other embodiments, the bags have an outer wall panel that lacks any seam that runs along the entire vertical length when installed—namely from the bottom panel to the closure at the open end. In some embodiments, the outer wall panel is a seamless cylindrical tube, which is secured to the bottom panel by an internal seam and has a closure on the open end of the cylindrical wall panel. The closure can include a seam, a crimp, a wire tie, and others. In some embodiments, the wall and bottom panels are made of the same material or different materials.

A pure water system is provided that includes a tank having an inner surface, a cover assembly forming a fluid tight connection with the tank, and purification media disposed in a porous elastomeric filter bag. The filter bag is positioned in and sealingly engages the inner surface of the tank.

In some embodiments alone or in combination with one or more of the aforementioned or aft mentioned embodiments, the purification media is deionizing resin.

In other embodiments alone or in combination with one or more of the aforementioned or aft mentioned embodiments, the filter bag has sufficient resiliency to maintain the purification media in a compressed state within the filter bag.

In other embodiments alone or in combination with one or more of the aforementioned or aft mentioned embodiments, the filter bag has sufficient resiliency to maintain the purification media in a compressed state within the filter bag after the purification media has been at least partially depleted.

In other embodiments alone or in combination with one or more of the aforementioned or aft mentioned embodiments, the purification media is sufficient to treat or condition water passing therethrough by removing one or more components, adding one or more components, and any combinations thereof.

In other embodiments alone or in combination with one or more of the aforementioned or aft mentioned embodiments, the cover assembly includes a release assembly movable between a first position and a second position so that a single movement of the release assembly from the first position to the second position vents pressure from the tank and unlocks the cover assembly from the tank.

In other embodiments alone or in combination with one or more of the aforementioned or aft mentioned embodiments, the pure water system includes a radial pins on either the tank or the cover assembly, and bayonet slots that correspond in number, size, and position to the radial pins. The bayonet slots are on either the tank or the cover assembly so that the radial pins and bayonet slots secure the cover assembly and the tank to one another to form the fluid tight connection.

In other embodiments alone or in combination with one or more of the aforementioned or aft mentioned embodiments, the cover assembly includes release assembly that has a pressure control plunger and a locking arm operatively coupled to a pivot lever movable between a first position and a second position.

In other embodiments alone or in combination with one or more of the aforementioned or aft mentioned embodiments, the pressure control plunger, when in the first position, forms a fluid tight connection with the cover assembly and the locking arm prevents removal of one of the radial pins from a respective one of the bayonet slots, and, when in the second position, the pressure control plunger vents the cover assembly and the locking arm allows removal of the one of the radial pins from the respective one of the bayonet slots.

In other embodiments alone or in combination with one or more of the aforementioned or aft mentioned embodiments, the locking arm is configured so that a single movement of the pivoting lever from the first position to the second position vents pressure from the tank and unlocks one of the radial pins from a respective one of the bayonet slots.

In other embodiments alone or in combination with one or more of the aforementioned or aft mentioned embodiments, the pure water system includes an expansion tube having a first end including the radial pins and a second end including the bayonet slots so that the first end is configured to form the fluid tight connection with one of the cover assembly and the tank and the second end is configured to form the fluid tight connection with the other of the cover assembly and the tank.

In other embodiments alone or in combination with one or more of the aforementioned or aft mentioned embodiments, the pure water system includes a first diffuser plate in the tank. The first diffuser plate has an inner area with fluid passage openings.

In other embodiments alone or in combination with one or more of the aforementioned or aft mentioned embodiments, the fluid passage openings include mesh covering the openings.

In other embodiments alone or in combination with one or more of the aforementioned or aft mentioned embodiments, the first diffuser plate includes an outer area that is at least sealingly engaged with the inner surface of the tank.

In other embodiments alone or in combination with one or more of the aforementioned or aft mentioned embodiments, the first diffuser plate is secured in the tank or is movable within the tank.

A pure water system is provided that includes a tank having a first dimension and an upper rim, a cover assembly having a second dimension and a lower rim, a radial pins on one of the first or second dimension, and bayonet slots that correspond in number, size, and position to the radial pins. The bayonet slots being on the other of the first or second dimension so that the radial pins and bayonet slots secure the cover assembly and the tank to one another with the upper and lower rims forming a fluid tight connection in a first configuration.

In some embodiments alone or in combination with one or more of the aforementioned or aft mentioned embodiments, the first dimension is an inner diameter or an outer diameter.

In other embodiments alone or in combination with one or more of the aforementioned or aft mentioned embodiments, the pure water system includes an expansion tube having a first end including the radial pins and a second end including the bayonet slots so that the first end is configured to form the fluid tight connection with one of the cover assembly and the tank and the second end is configured to form the fluid tight connection with the other of the cover assembly and the tank.

In other embodiments alone or in combination with one or more of the aforementioned or aft mentioned embodiments, the cover assembly includes a release assembly having a pressure control plunger and a locking arm operatively coupled to a pivot lever movable between a first position and a second position so that a single movement of the pivoting lever from the first position to the second position vents pressure from the tank and unlocks the cover assembly from the tank.

In other embodiments alone or in combination with one or more of the aforementioned or aft mentioned embodiments, the cover assembly includes a handle positioned with sufficient proximity an end of the pivot lever so that normal positioning of a hand of a user on the handle allows a thumb of the user to be positioned at the end of the pivot lever.

In other embodiments alone or in combination with one or more of the aforementioned or aft mentioned embodiments, the pure water system includes loose deionizing resin beads in the tank.

In other embodiments alone or in combination with one or more of the aforementioned or aft mentioned embodiments, the pure water system includes purification media disposed in an elastomeric and porous filter bag. The filter bag is in the tank in sealing engagement with an inner surface of the tank.

In other embodiments alone or in combination with one or more of the aforementioned or aft mentioned embodiments, the purification media is deionizing resin.

A purification assembly for a pure water system is provided that includes purification media disposed in filter bag having at least a porous portion and at least an elastomeric portion.

In some embodiments alone or in combination with one or more of the aforementioned or aft mentioned embodiments, the purification media is deionizing resin.

In other embodiments alone or in combination with one or more of the aforementioned or aft mentioned embodiments, the purification assembly includes a diffuser plate having an inner area with a fluid passage openings.

In other embodiments alone or in combination with one or more of the aforementioned or aft mentioned embodiments, the diffuser plate has an outer area that lacks openings. The outer area sealingly engages the elastomeric portion of the filter bag with the fluid passage openings in fluid communication with the porous portion of the filter bag.

In other embodiments alone or in combination with one or more of the aforementioned or aft mentioned embodiments, the filter bag includes a bottom panel that is seamless at least in areas where the filter bag sealingly engages the outer area of the diffuser plate.

In other embodiments alone or in combination with one or more of the aforementioned or aft mentioned embodiments, the filter bag includes an outer wall panel with an open end and an end closed by a bottom panel via an internal seam.

In other embodiments alone or in combination with one or more of the aforementioned or aft mentioned embodiments, the purification assembly includes a closure closing the open end of the outer wall panel. The closure is one or more of a seam, a crimp, and a wire tie.

In other embodiments alone or in combination with one or more of the aforementioned or aft mentioned embodiments, the outer wall panel lacks any seam that runs between the open and closed ends.

In other embodiments alone or in combination with one or more of the aforementioned or aft mentioned embodiments, the filter bag has an outer wall panel with upper and lower ends. The filter bag lacks any seams that run between the upper and lower ends.

In other embodiments alone or in combination with one or more of the aforementioned or aft mentioned embodiments, the outer wall panel is a seamless cylindrical tube and/or is elastomeric.

In other embodiments alone or in combination with one or more of the aforementioned or aft mentioned embodiments, the filter bag has sufficient resiliency to maintain the purification media in a compressed state within the filter bag even after the purification media has been at least partially depleted.

The above-described and other features and advantages of the present disclosure will be appreciated and understood by those skilled in the art from the following detailed description, drawings, and appended claims.

BRIEF DESCRIPTION OF THE SEVERAL VIEWS OF THE DRAWINGS

FIGS. 21*a*-21*f* are images of a second resin usage test using the system of FIG. 1 with a static filter plate;

FIGS. 22*a*-25*f* are images of a third resin usage test using the system of FIG. 1 with a dynamic filter plate of FIG. 19; and FIG. 23 is a top perspective view of another alternate embodiment of a dynamic or movable or floating diffuser plate according to an exemplary embodiment of the present disclosure;

FIG. 24 is a bottom perspective view of the dynamic or movable or floating diffuser plate of FIG. 23;

FIGS. 25*a*-25*f* are images of a forth resin usage test using the system of FIG. 1 with a dynamic filter plate of FIGS. 23-24.

DETAILED DESCRIPTION

Figure 1:
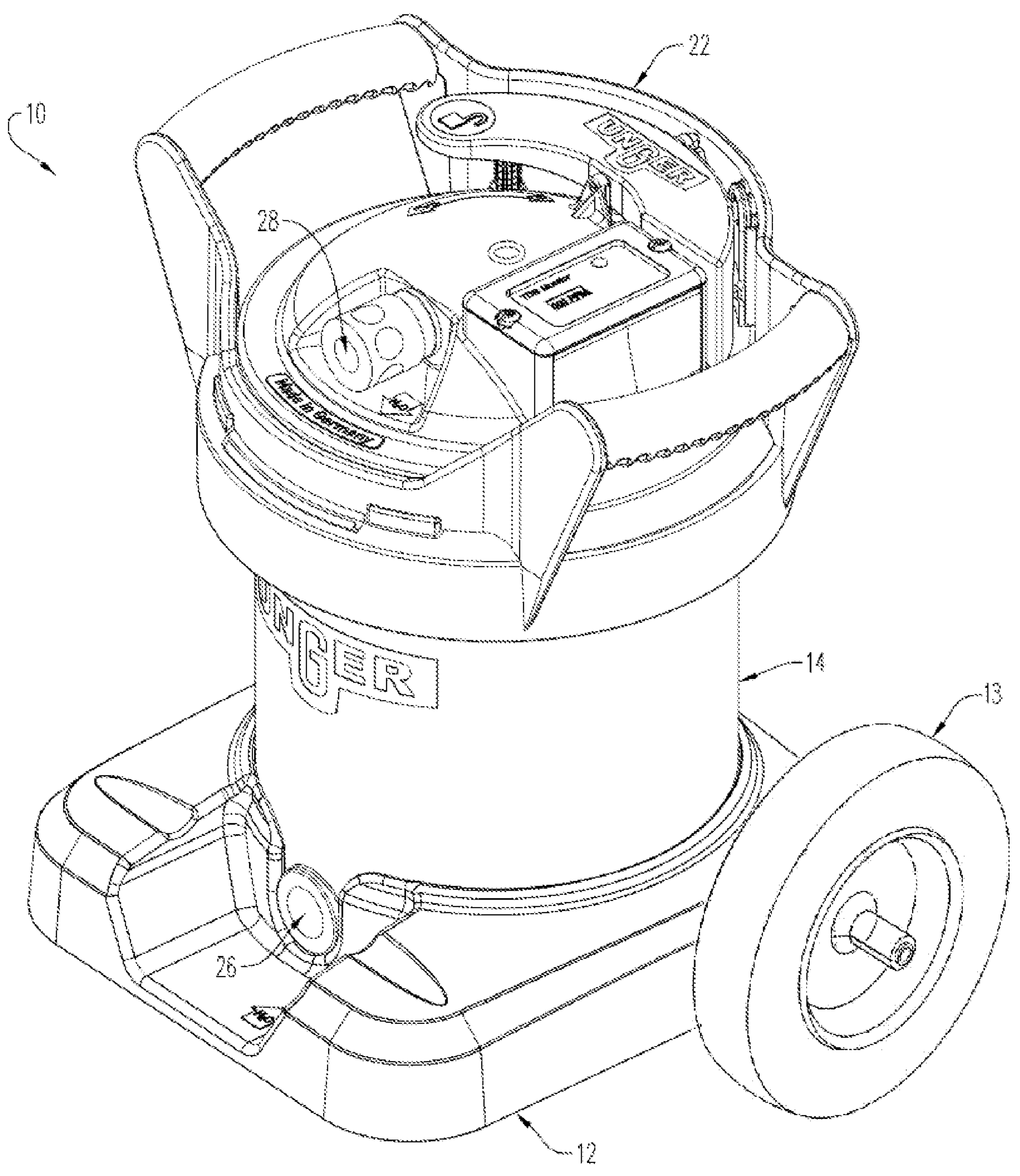
FIG. 1 is a top perspective view of an exemplary embodiment of a pure water system according to the present disclosure.
Figure 2:
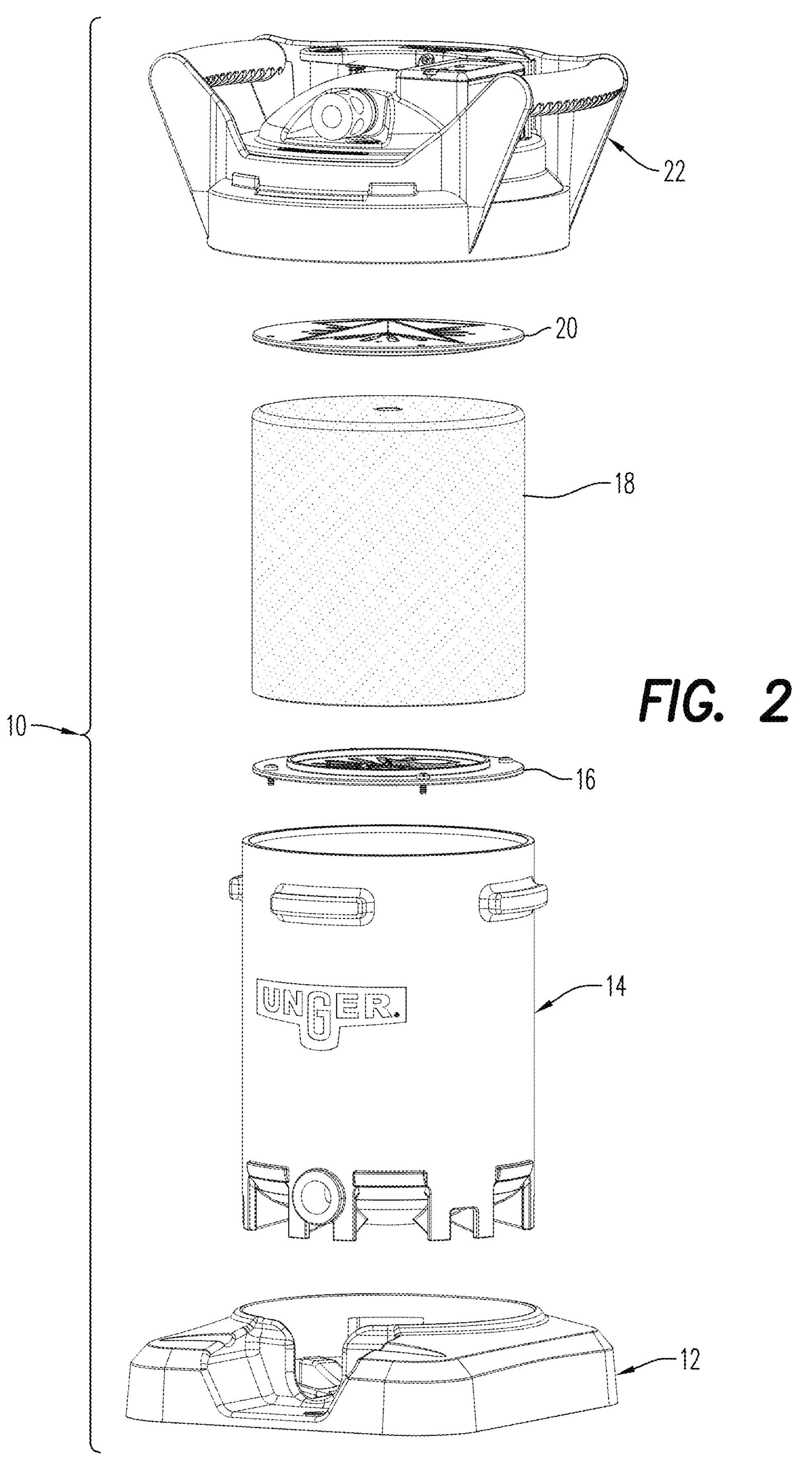
FIG. 2 is an exploded view of the pure water system of FIG. 1.

Referring to the drawings and in particular to FIGS. 1-5, an exemplary embodiment of a pure water system according to the present disclosure is shown and is generally referred to by reference numeral 10. System 10 includes a base 12, a tank 14, a first diffuser plate 16, purification media 18, a second diffuser plate 20, and a cover assembly 22.

System 10 is a modular system that allows for expansion of the purification volume by simply adding in one or more expansion tubes 24 (FIGS. 4-5) between bottom tank 14 and the cover assembly 22, with a corresponding increase in the amount of purification media 18. In this manner, the treatment volume of system 10 can be tailored to the particular use.

In some applications, the water purification process can also be used to treat or condition the water. For example, the purification media (i.e., filters, membranes, resin, and others) can be used to treat or condition the water by removing one or more components and/or by adding one or more components such as, but not limited to, elements, compounds, ions, and others. Therefore, the term "purification" and "pure" and "purified" as used herein shall include the removal of one or more components, the addition of one or more components, and any combinations thereof.

Figure 3:
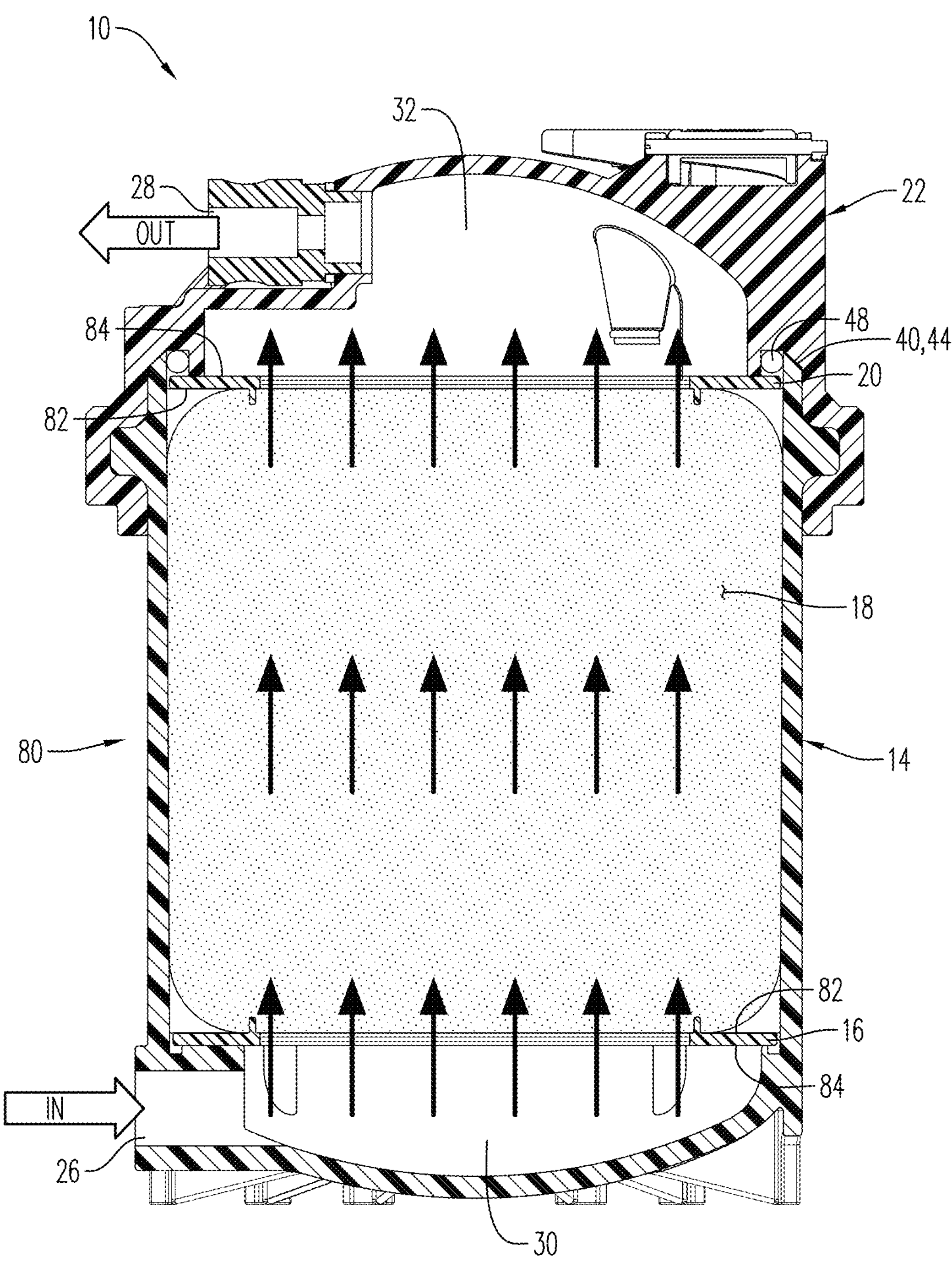
FIG. 3 is a sectional view of the pure water system of FIG. 1.

As seen in FIG. 3, tank 14 has a first port 26 and cover assembly 22 has a second port 28. Tank 14 is configured to define a first reservoir 30 between first port 26 and first diffuser plate 16. Similarly, cover assembly 22 is configured to define a second reservoir 32 between second diffuser plate 20 and second port 28.

Ports 26, 28 are inset within system 10 to prevent damage during use and transport. For example, port 26 is inset within tank 14 so that the base protects the port from impact or damage. Similarly, port 28 is inset within cover assembly 22 so that the cover assembly protects the port from impact or damage.

During use, a pressurized water source (not shown) is fluidly connected to first port 26 and a cleaning implement (not shown) is fluidly connected to second port 28.

In a preferred embodiment, the pressurized water source is a normal residential or commercial water source having a pressure of approximately 40 to 60 pounds per square inch (psi). Of course, system 10 is contemplated for use with any pressurized water source such as, but not limited to, pumped systems and at any desired pressure.

In a preferred embodiment, the cleaning implement is water fed pole such as, but not limited to, that described in Applicants' own U.S. Pat. No. 7,748,755, the contents of which are incorporated herein by reference thereto. Of course, system 10 is contemplated for use with any cleaning implement.

For ease of discussion, system 10 is described above by way of example only having an upward flow direction—namely with the pressurized source of water connected to first port 26. Of course, it should be recognized that system 10 finds equal use with the pressurized source of water connected to second port 28—namely with a reversed flow to that illustrated.

In use, untreated water flows into system 10 through first port 26 and into first reservoir 30. Without wishing to be bound by any particular theory, first reservoir 30 and first diffuser plate 16 are believed to guide the untreated water so as to flow into purification media 18 in a diffused or spread manner so as to not concentrate the flow of the untreated water onto any one location of the purification media. Additionally in some embodiments and to assist in guiding water into and out of purification media 18 in a desired manner, diffuser plates 16, 20 can be removably sealingly engaged or, preferably, secured in a water tight manner, to tank 14 and/or cover assembly 22, respectively, to mitigate the leakage or flow of water around an external dimension of plates 16, 20. However and as described with respect to FIGS. 20-24, plate 16 and/or plate 20 can also be configured to slide within tank 14.

The untreated water flows through purification media 18, where it is finished or polished to a desired water quality, before exiting through second diffuser plate 20 into second reservoir 32 and out of system 10 through second port 28. Purification media 18 will become saturated, depleted, or otherwise ineffective ("depleted") after a certain period of use, at which point the purification media can be replaced with new or fresh media as will be described in more detail herein below.

As will be described in more detail below, system 10 is configured to ensure water passing through the system has sufficient residence time in contact with the purification media 18 so as to be treated to a desired level. Many prior art systems resolve the issue of residence time in contact with the filter media by providing the media in a long, narrow configuration. However and without wishing to be bound by any particular theory, such long, narrow designs eliminate the capability to provide the modularity, mobility, and/or ease of media removal and replacement that is possible with the configuration of system 10.

Thus, system 10 is configured so that tank 14 has a ratio of its internal dimension (e.g., diameter) to its longitudinal length of about 1:1. For example, system 10 can, in some embodiments have an inner diameter of about 200 mm and a distance between diffuser plates 16, 20 of about 220 mm. Of course, it is contemplated by the present disclosure for tank 14 to have any desired ratio larger or smaller than 1:1 such as, but not limited to from about 1:4 to about 4:1, more preferably from about 1:3 to about 3:1, with between about 1:2 to about 2:1 being most preferred.

The residence time in contact with media 18 is provided by system 10 by the flow rate of water through the system. The flow rate is determined by, among other variables, the water pressure at first port 26, the restriction at the first port, the geometry of tank 14, the restriction generated by first and second diffuser plates 16, 20, the restriction generated by media 18, and the restriction generated by second port 28 as well as any tubing or products attached to the second port.

For ease of manufacture and assembly, first and second diffuser plates 16, 20 can be identically formed. Of course, it is contemplated by the present disclosure for first and second diffuser plates 16, 20 to have configurations that differ from one another.

Figure 11:
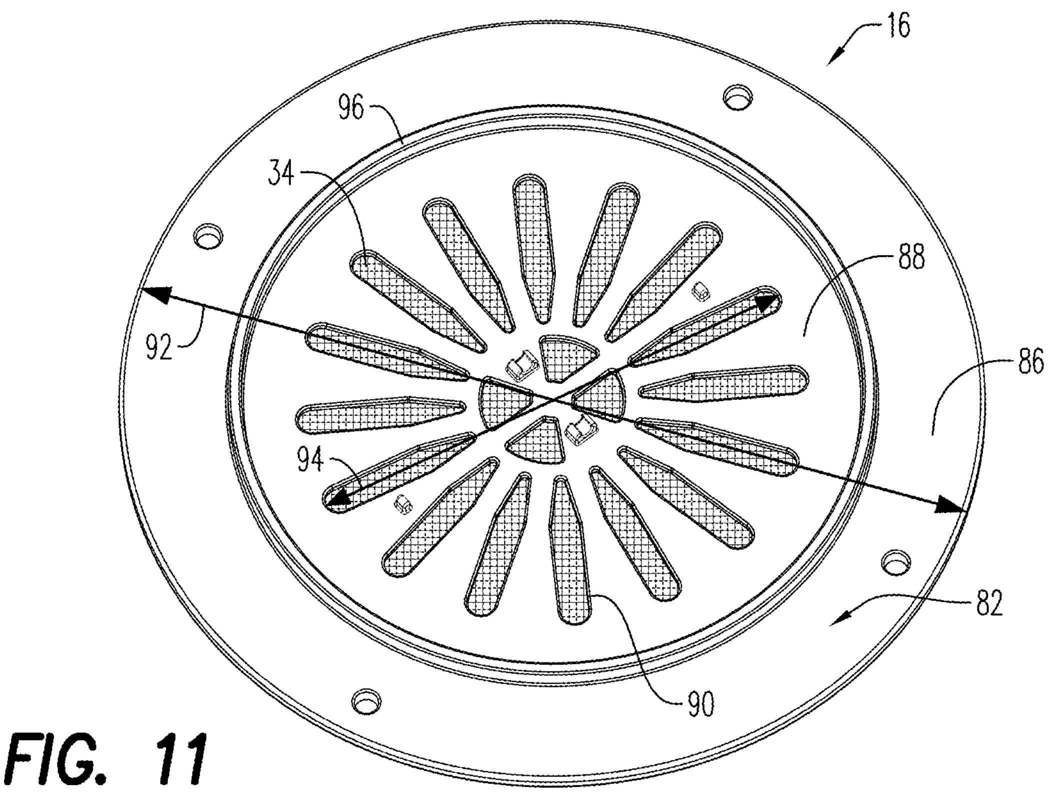
FIG. 11 is a perspective view of an exemplary embodiment of a diffuser according to the present disclosure.

In the illustrated embodiments, first and/or second diffuser plates 16, 20 preferably further include a filter membrane or mesh 34 as also shown in FIG. 11.

In the case of first diffuser plate 16, membrane 34, when present, can be any member sufficient to act as a particulate filter to remove suspended particles before exposing of the water to purification media 18, entrap any loose purification media, create back pressure within the system, ensure uniform flow, and any combinations thereof. Preferably, membrane 34 at first diffuser plate 16 removes suspended particles having a size between about 50 micron and about 400 micron, with about 200 micron to 300 micron being preferred.

In the case of second diffuser plate 20, membrane 34, when present, can be any member sufficient to act as a particulate filter to remove suspended particles remaining in the water after expose to purification media 18, entrap any loose purification media entrained in the treated water, create back pressure within the system, ensure uniform flow, and any combinations thereof. Preferably, membrane 34 at second diffuser plate 20 removes suspended particles having a size about 50 micron and about 400 micron, with about 200 micron to 300 micron being preferred.

For example and as described in more detail below, purification media 18 can include resin beads and, in this embodiment, first and second diffuser plates 16, 20 can maintain the resin within system 10.

Purification media 18 can be any media sufficient to provide pure water of a desired composition. In a preferred embodiment, purification media 18 is a plurality of deionizing resin beads (i.e., loose resin) such as, but not limited to mixed bed resin, non-mixed bed resin, and others. In one embodiment, media 18 can be a mixed bed resin known as MB400 that is commercially available from Purolite®.

In some embodiments, the purification media 18 is disposed within one or more porous filter bags 38. When using a mixed bed resin, the porous filter bag 38 can include both the anion and cation resin media. To optimize the resin utilization with different incoming water qualities, one or more of the porous filter bags 38 can include any combination of filter bags with different resin including but not limited to mixed bed, weak base anion, weak acid cation, strong base anion, strong acid cation, bags. It is also contemplated for the different types of media 18 to be included in separate porous bags, which are then associated or grouped together and placed within bag 38 to provide the desired purification.

Simply stated it is contemplated by the present disclosure for purification media 18 to be provided in any desired or customizable format to allow the desired purification and, when desired, to also provide system the scalability to add one or more expansion tubes 24.

In this manner, system 10 can be configured to provide pure water of any desired quality or condition such as, but not limited to, Type I water, Type II water, Type III water, other desired water conditions, or any combinations thereof by simply exchanging purification media 18 as desired.

In embodiments in which first and/or second diffuser plates 16, 20 lack membrane 34, it is contemplated for bag 38 of the purification media 18 to have a pore size sufficient to retain the resin and remove suspended particles having a size between about 50 micron and about 400 micron, with about 200 micron to 300 micron being preferred.

Although base 12 is illustrated as separate from tank 14, it is contemplated by the present disclosure for the base to be integrally formed with tank 14 or secured or fastened to tank 14. Moreover although base 12 is illustrated as being sufficient to support system 10 in a stationary position on a flat surface, it is also contemplated by the present disclosure for the base to include one or more wheels 13 to allow system 10 to be easily moved during use. Further, it is contemplated by the present disclosure for system 10 to include a wheeled cart or dolly (not shown), which supports base 12 and allows movement of the system as desired.

The modularity of system 10 is described in more detail with reference to FIGS. 4-7*f* where the system is shown, by way of example, having a bayonet-type connection between tank 14, cover assembly 22, and, when present, expansion tube 24.

Tank 14 and each expansion tube 24 is configured with an upper rim 40 and a plurality of radial pins 42 (four shown). Additionally, cover assembly 22 and each expansion tube 24 is configured with a lower rim 44 and a plurality of bayonet slots 46, which correspond in number, size, and position to pins 42.

It should be recognized that system 10 is described herein by way of example only as having pins 42 on tank 14 and the upper rim 40 of tube 24 and having slots 46 on the lower rim 44 of the tube. Of course, it is contemplated by the present disclosure for this arrangement to be reversed, namely for system 10 to be configured so that pins 42 are present on lower rim 44 and slots 46 are present on tank 14 and upper rim 40 of the tube.

Additionally, it should be recognized that system 10 is described herein by way of example only as having pins 42 on the outer dimension (e.g. diameter) of tank 14 and tube 24. Of course, it is contemplated by the present disclosure for this arrangement to be reversed.

During assembly in the most basic or unexpanded form with system 10 lacking any expansion tube 24, cover assembly 22 is secure directly to tank 14. Here, radial pins 42 of tank 14 are received in slots 46 of cover assembly 22. Once pins 42 are received in slots 46, with tank 14 and cover assembly 22 are rotated with respect to one another about the longitudinal axis of system 10 so as to form a fluid tight engagement of upper and lower rims 40, 44 to one another.

In some embodiments, cover assembly 22 can include a seal 48 for ensuring fluid tight engagement of upper and lower rims 40, 44 to one another. In the embodiment illustrated in FIG. 7*b*, seal 48 is positioned against an inner surface of upper rim 40. In this position, seal 48 is placed in shear by the contact with the inner surface of upper rim 40. Seal 48 can include any sealing device such as, but not limited to, an O-ring, an X-ring, a molded in thermoplastic elastomer (TPE) or silicon member.

In some embodiments, seal 48 is configured to assist in maintaining upper and lower rims 40, 44 engaged to one another in a fluid tight manner by, for example, provide a spring force to the bayonet connection and/or a frictional force sufficient to assist in maintaining radial pins 42 received in slots.

Of course, it is contemplated for seal 48 to have any desired position such as, but not limited to, positioned so as to seal against an outer surface of upper rim 40 so as to be in shear as discussed above. Additionally, it is contemplated for seal 48 to be positioned against an upper surface of upper rim 40 so as to be in compression as discussed above.

When additional volume of purification media 18 is desired so as to provide additional volume of pure water before replacement of the media, system 10 can be expanded by adding one or more expansion tubes 24 between tank 14 and cover assembly 22. Here, radial pins 42 of tank 14 are received in slots 46 of a first expansion tube 24 and the tank. Once pins 42 are received in slots 46, tank 14 and expansion tube 24 are rotated with respect to one another about the longitudinal axis of system 10 so as to form a fluid tight engagement of upper and lower rims 40, 44 to one another.

In some embodiments, expansion tube 24 can include a seal 49 for ensuring fluid tight engagement of upper and lower rims 40, 44 to one another. In the embodiment illustrated in FIG. 7*c*, seal 49 is positioned against an upper surface of upper rim 40. In this position, seal 49 is placed in compression by the contact with the upper surface of upper rim 40. Seal 49, much like seal 48 discussed above, can include any sealing device such as, but not limited to, an O-ring, an X-ring, a molded in thermoplastic elastomer (TPE) or silicon member.

In some embodiments, seal 49 is configured to assist in maintaining upper and lower rims 40, 44 in fluid tight engagement to one another by, for example, provide a spring force to the bayonet connection and/or a frictional force sufficient to assist in maintaining radial pins 42 received in slots.

Of course, it is contemplated for seal 49 to have any desired position such as, but not limited to, positioned against an inner or outer surface of upper rim 40 and placed in shear as discussed above.

Additional expansion tubes 24 are added, as needed, by inserting radial pins 42 of one expansion tube 24 into slots 46 of another expansion tube 24. Once pins 42 are received in slots 46, the expansion tubes 24 are rotated with respect to one another about the longitudinal axis of system 10 so as to form a fluid tight engagement of upper and lower rims 40, 44 to one another.

Figure 7A:
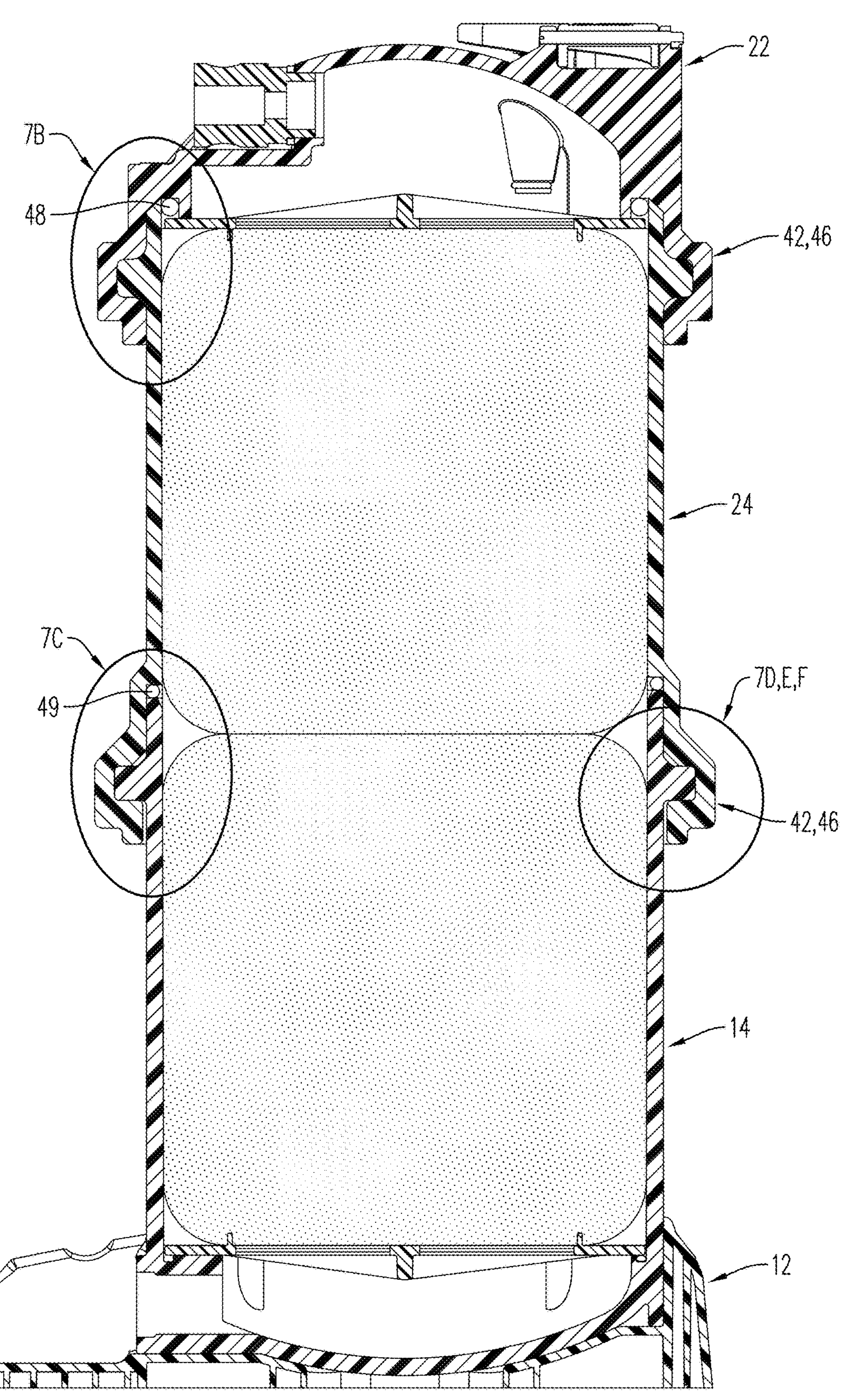
FIG. 7*a* is a sectional view of the pure water system of FIG. 4.
Figure 7C:
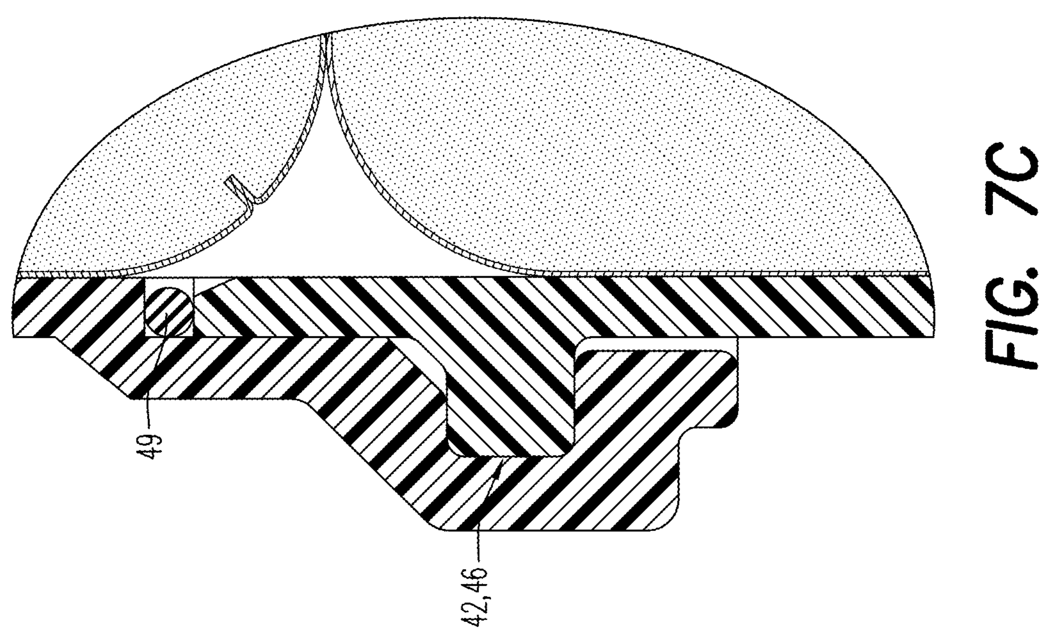
FIG. 7*c* is an expanded view of a portion of the pure water system taken at circle 7*c* of FIG. 7*a;*
Figure 7B:
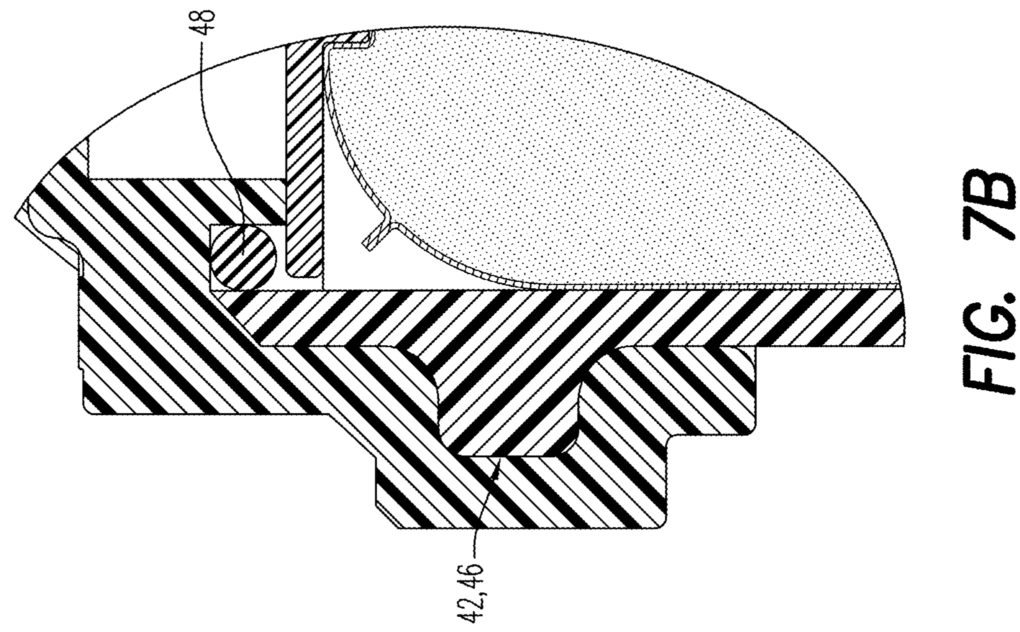
FIG. 7*b* is an expanded view of a portion of the pure water system taken at circle 7*b* of FIG. 7*a;*
Figures 7D, 7E, 7F:
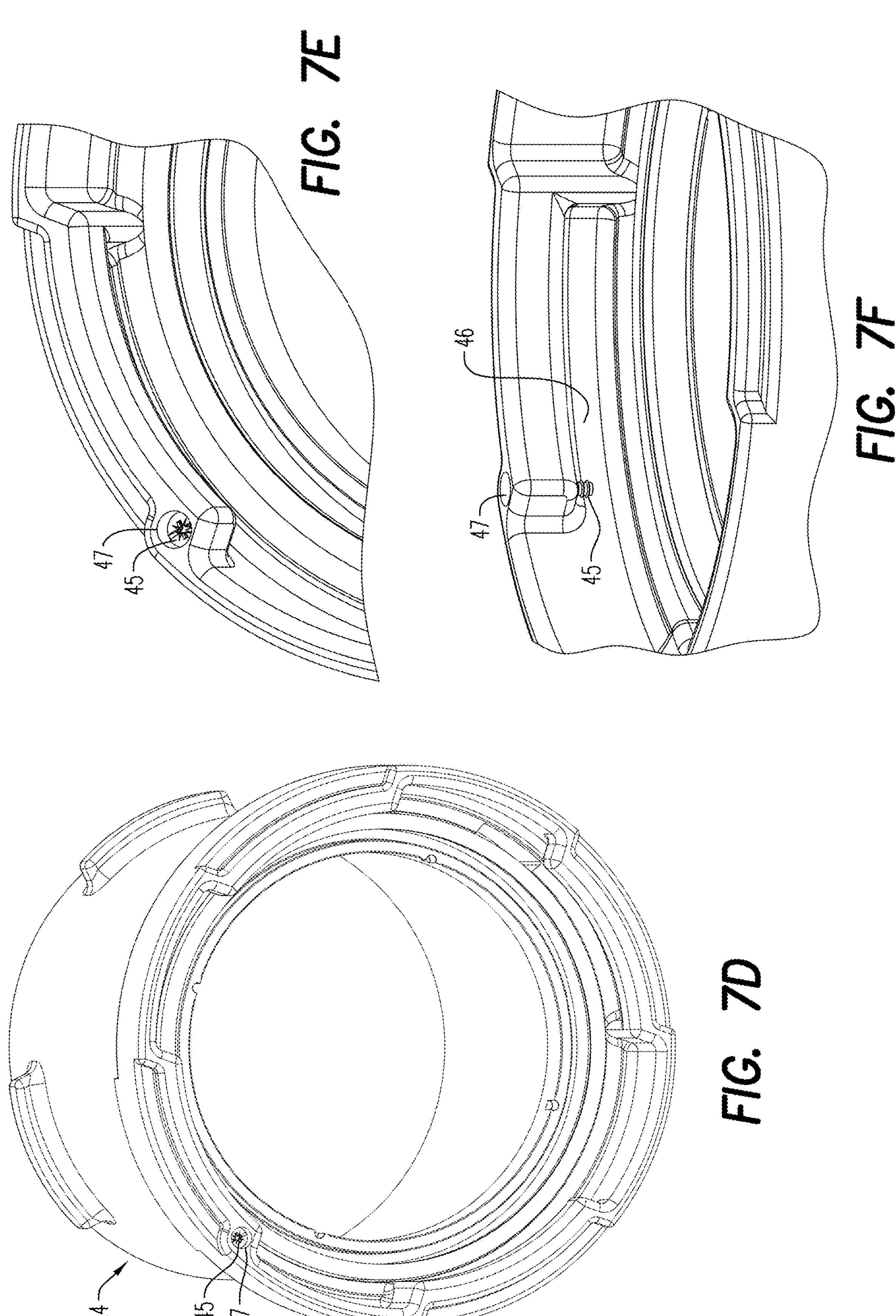
FIG. 7*d* is a bottom view of the expansion tube of FIG. 4.
FIG. 7*e* is an expanded view of a portion of the expansion tube taken at circle 7*e* of FIG. 7*d;*
FIG. 7*f* is a side view of the portion of the pure water system of FIG. 7*e;*

In the embodiments shown in FIGS. 7*d*-7*f*, expansion tubes 24 can include a locking member 45. After assembly of expansion tube 24 to tank 14, or to another expansion tube 24, locking member 45 can be inserted through an opening 47 proximate lower rim 44 and into slot 46. When locking member 45 extends into slot 46, a side of the locking member 45 abuts locking pin 42 to prevent the pin from being withdrawn from the slot. In some embodiments, locking member 45 can be a screw.

After sufficient expansion tubes 24 have been added to provide system 10 with the desired volume, cover assembly 22 is installed on the upper expansion tube 24. Here, radial pins 42 of the uppermost expansion tube 24 are received in slots 46 of cover assembly 22. Once pins 42 are received in slots 46, cover assembly 22 and expansion tube 24 are rotated with respect to one another about the longitudinal axis of system 10 so as to form a fluid tight engagement of upper and lower rims 40, 44 to one another.

While system 10 is discussed above by way of example having a bayonet type connection, it is of course contemplated by the present disclosure for radial pins 42 and/or slots 46 to have a predefined thread angle so as to ensure fluid tight engagement of upper and lower rims 40, 44 to one another within the rotational displacement of the pins within the slots. Additionally, it is contemplated by the present disclosure for slots 46 to include a serif (not shown) or short upward segment at the end of the horizontal arm into which the radial pins are pushed upwards into by the action of the seals, when present.

Although not described in detail above, before closing system 10 by connecting cover assembly 22 to tank 14 or the uppermost expansion tube 24, the inner volume is filled with purification media 18. In this manner, system 10 can easily be scaled to increase or decrease the volume of purification media 18 within the system, which allows system 10 to provide different volumes of pure water before needing replacement of the purification media.

In the illustrated embodiment, tank 14 and expansion tube 24 have a similar internal volume so that the addition of one expansion tube doubles the volume of the system. As will be described in more detail below, system 10 is further configured with purification media 18—in the form of a mix bed resin—disposed in porous bag 38. Thus, the ease of scalability of system 10 is further improved by allowing the user to simply add one bag 38 of purification media 18 for the filter volume provided by tank 14 and to add a corresponding bag 38 of purification media 18 for each expansion tube 24 added to the system.

It should be recognized that the exemplary embodiment is disclosed as being linearly scalable when using mix bed resin as filter media 18 by adding an additional bag 38 for each expansion tube 24. Of course, it is contemplated by the present disclosure for system 10 to be non-linearly scalable by adding the same or different bags 38 of filter media 18 as expansion tubes 24 are added. Further, it is contemplated by the present disclosure for purification media 18 to be any combination of mixed bed resin and/or non-mixed bed resin that can be disposed in any desired number or combination of separate porous bags 38 and that should also be understood to be easily scalable.

To assist in the installation and removal of purification media 18, system 10 has a large internal dimension. For example, it is contemplated by the present disclosure for tank 14 and expansion tubes 24, when present, have an internal diameter of about 200 millimeters (mm).

Figure 8:
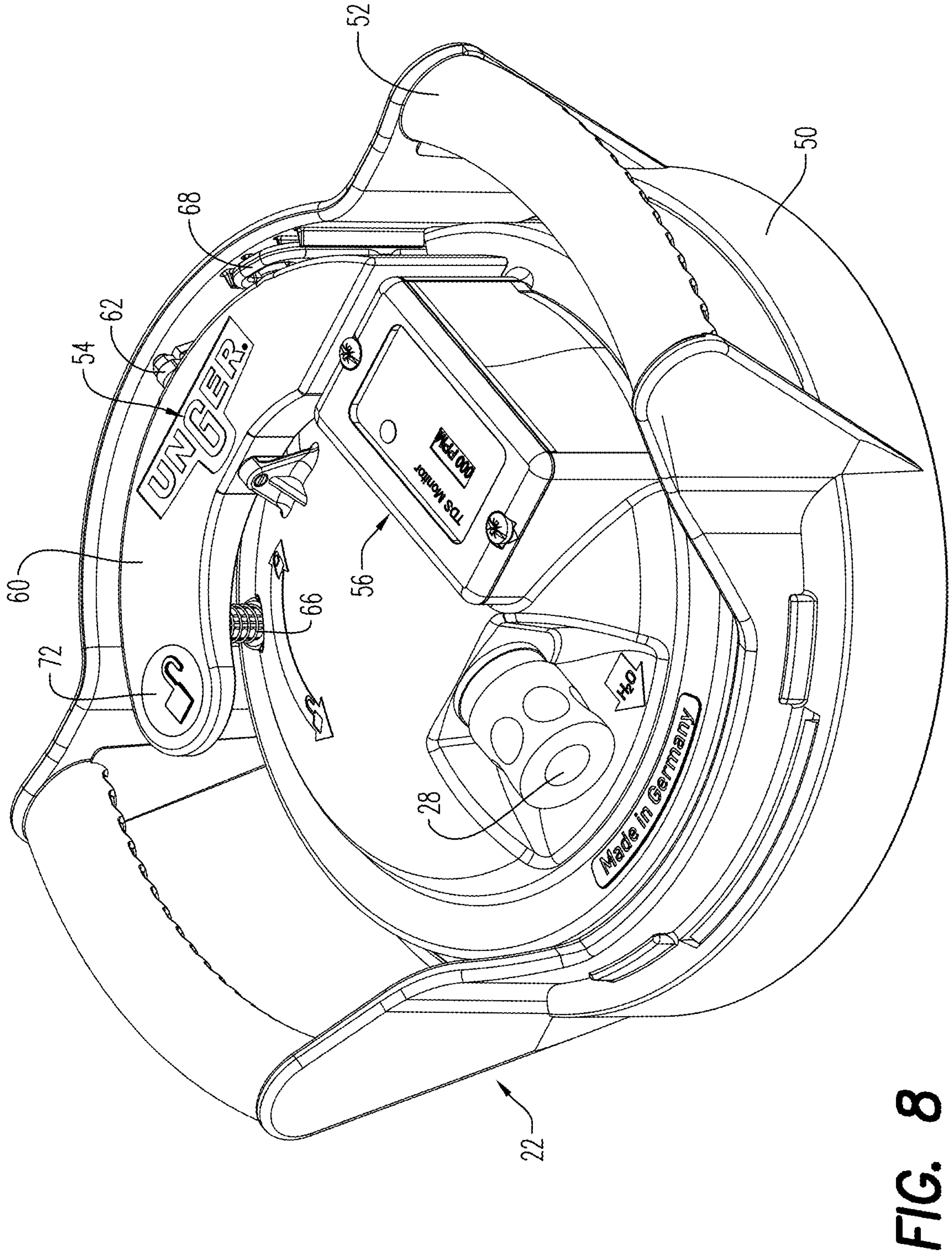
FIG. 8 is a top perspective view of an exemplary embodiment of a cover assembly according to the present disclosure for use with the pure water system of FIG. 1.
Figure 9:
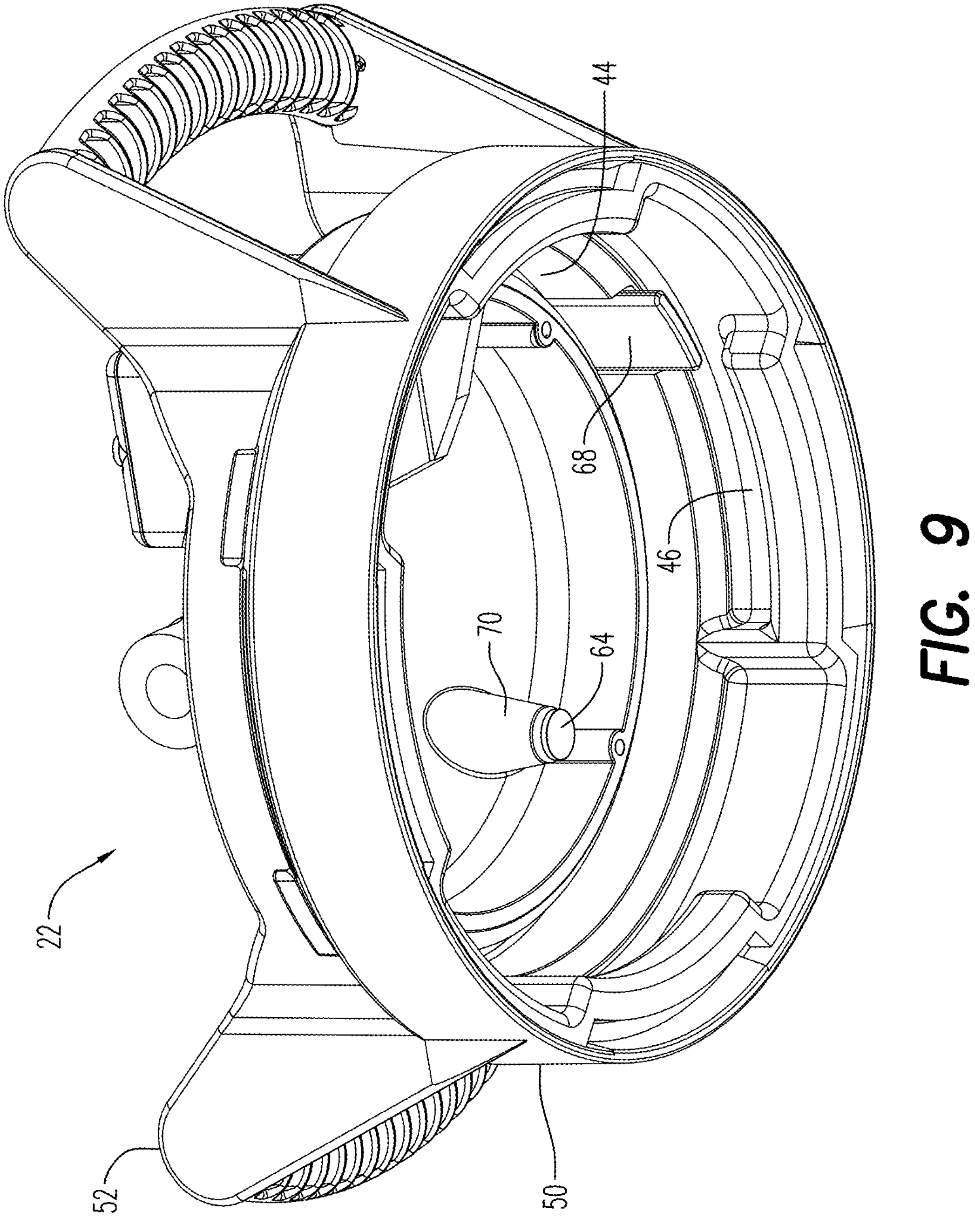
FIG. 9 is a bottom perspective view of the cover assembly of FIG. 8.
Figure 10:
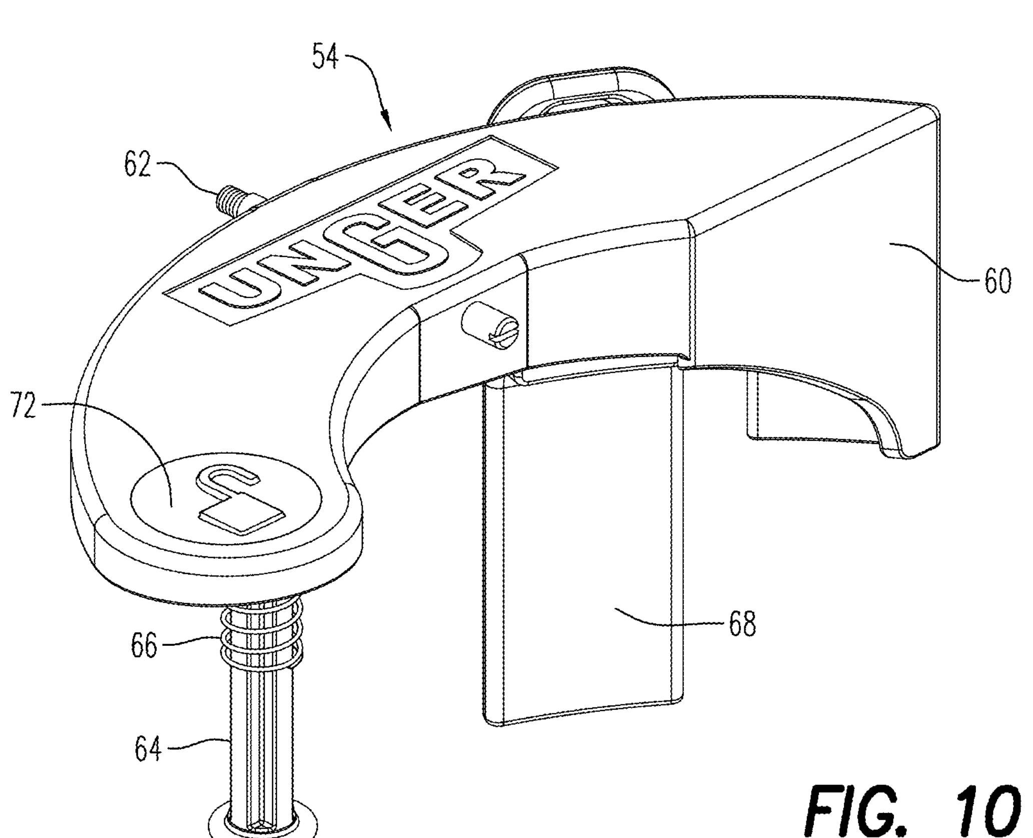
FIG. 10 is a perspective view of the release assembly that forms part of the cover assembly of FIGS. 8 and 9.

Cover assembly 22 is described in greater detail with respect to FIGS. 8-10. Cover assembly 22 includes a top cap 50, a handle 52, a release assembly 54, and, in some embodiments, a meter 56 for measuring one or more water parameters such as, but not limited to, total dissolved solids, conductivity, flow rate, pressure, volume, and other parameters.

Top cap 50 includes lower rim 44 discussed above, while handle 52 includes slots 46 discussed above. Top cap 50 and handle 52 can be formed as one, unitary member or, as shown, as separate members. Moreover, it is contemplated by the present disclosure for top cap 50 and handle 52 to be formed as separate members that are connected or secured to one another in any desired manner.

Release assembly 54 can include a pressure releasing function for air and/or water in system 10 and an anti-rotation lock. Namely, it has been determined that disassembly of system 10 having the bayonet-type interconnections can be aided by releasing any internal pressure before attempting to remove cover assembly 22 from tank 14 and/or expansion tubes 24, when present. It has also been determined that handling of system 10 via handle 52 during normal use can inadvertently lead to a loosening of cover assembly 22 from tank 14 or expansion tube 24, when present. Advantageously, release assembly 54 integrates the pressure releasing and anti-rotation functions into one simple and easy to use mechanism.

Release assembly 54 includes a lever 60, a pivot axis 62, a pressure releasing plunger 64, a biasing member 66, and a locking arm 68. Lever 60 is secured to top cap 50 for pivoting movement by pivot axis 62. Biasing member 66 normally biases lever 60 to a first position (shown) with plunger 64 seated against an underside 70 of cap 50 and locking arm 68 extending through the cap into slot 46 to form a fluid tight connection. In some embodiments, plunger 64 can include a seal to assist in seating the plunger against underside 70 of cap 50 in the fluid tight manner.

In the first position, plunger 64 prevents or mitigates pressure within system 10 from escaping through release assembly 54 and locking arm 68 prevents or mitigates radial pins 42 from inadvertently being withdrawn from slots 46. Specifically, when locking arm 68 extends into slot 46 in the first position, a side of the locking arm abuts locking pin 42 to prevent the pin from being withdrawn from the slot.

Application of downward pressure on lever 60 at an end 72 in an amount sufficient to overcome biasing member 66 causes the lever to pivot about pivot axis 62 to a second position (not shown). In the second position, plunger 64 has moved downward away from underside 70 of cap 50 a distance sufficient to allow pressure to vent from within system 10 and locking arm 68 has moved upward away from slots 46 a distance sufficient to allow radial pins 42 to be withdrawn from slots 46.

Advantageously, lever 60 is positioned in cap 50 with sufficient proximity to handle 52 so that the normal positioning of the user's hands on the handle allows the user's thumb to be positioned over end 72. In this manner, the user can depress end 72 downward with their thumb while grasping and rotating handle 52.

Additionally, plunger 64 is positioned under lever 60 and shielded by handle 52 in such a manner so that any fluid spray that may exit cap 50 during the venting of pressure within system 10 is prevented or mitigated from spraying upward and/or radially outward, to reduce the water directed towards the user.

A purification assembly 80 of system 10 is described with reference to FIGS. 3 and 11-17. The purification assembly 80 includes purification media 18 and bag 38 and, in some embodiments, first and/or second diffuser plate 16, 20.

It has been determined by the present disclosure that the large internal dimension of system 10 that allows easy replacement of purification media unfortunately also provides a large surface area at the outer dimension of the purification media, particularly when present in bags 38, that can result in leakage of an undesired amount of untreated water around the outside of the purification media.

Stated another way, the large inner diameter of system 10 can result in untreated water flowing between the outer dimension of purification media 18, when present in bag 38, and the inner surface of tank 14 and, when present, one or more expansion tubes 24.

Advantageously, filter assembly 80 has features that alone and/or in combination are configured to mitigate such leakage. The features include the shape and configuration of the plates 16, 20, the shape and construction of the purification media bags 38, the material of the purification media bags 38, and any combinations thereof.

Plates 16, 20 each have a media facing surface 82 and a reservoir facing surface 84. In embodiments where plates 16, 20 have membrane 34 discussed above, the membrane 34 is preferably removably secured between surfaces 82, 84. Plates 16, 20 each have an outer area 86 and an inner area 88. Inner area 88 includes a plurality of openings 90, while outer area 86 is impervious to fluids, namely lacks any such openings. Stated another way, openings 90 extend to an outer dimension 94 that is less than an outer dimension 92 of plates 16, 20.

Figure 3A:
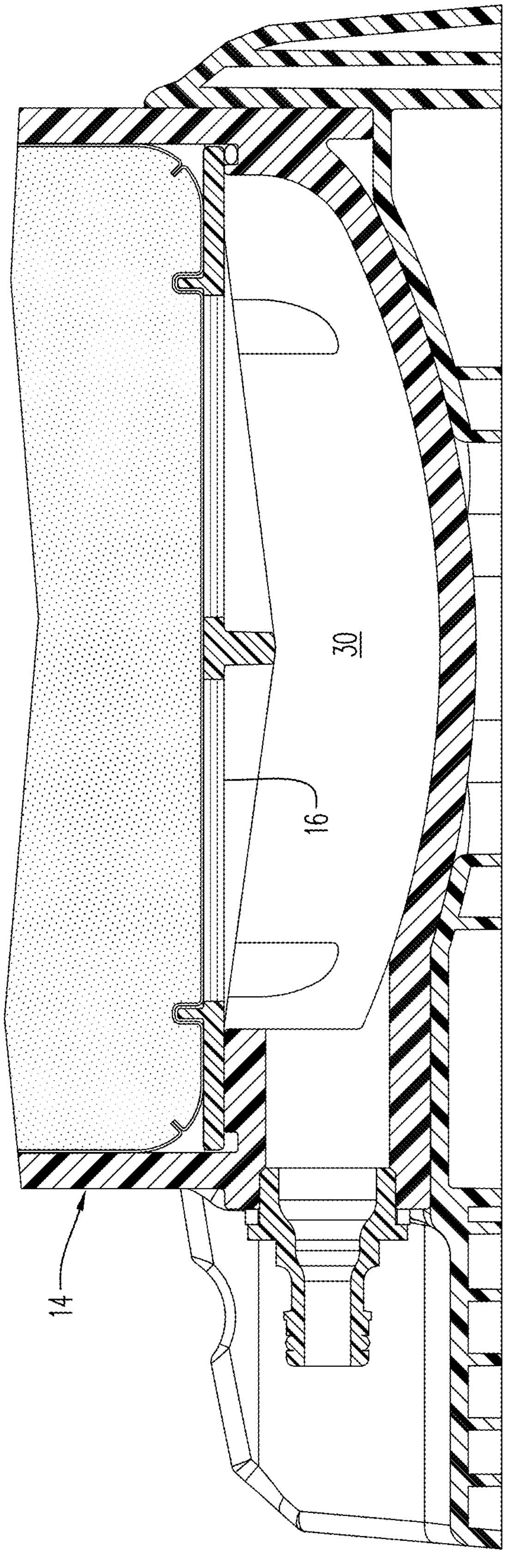
FIG. 3*a* is an expanded sectional view of the pure water system of FIG. 3.
Figure 5:
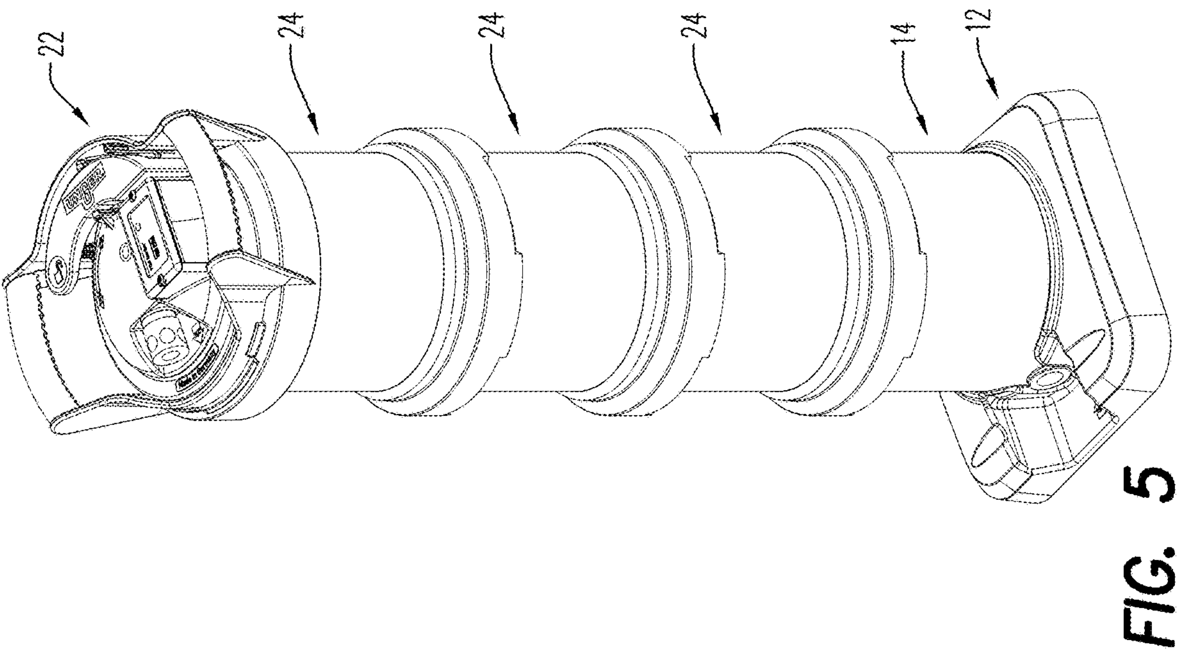
FIG. 5 is a top perspective views of the pure water system of FIG. 1 having three expansion tubes installed.

It has been determined by the present disclosure that providing plates 16 and/or 20 with outer area 86 impervious to fluids assists in guiding water into and/or out of purification media 18 in a manner that reduces or eliminates the flow of untreated water between the outer dimension of purification media 18 and the inner surface of tank 14 and/or extension tubes 24, when present. As shown in FIG. 3*a*, system 10 can include, in some embodiments a seal between first diffuser plate 16 and tank 14.

In one exemplary embodiment, plates 16, 20 have an outer dimension 92 of about 180 mm, while openings 90 have an outer dimension 94 of about 90 mm. It is contemplated by the present disclosure for plates 16, 20 to have ratio of outer dimension 92 to outer dimension 94 of between 1-to-4 and 3-to-4, more preferably 1-to-2.

In some embodiments, outer area 86 of media facing surface 82 can include an upstanding sealing rim 96. It has been determined by the present disclosure that upstanding sealing rim 96 can embed into and form an area of increased flow resistance with filter bag 38 that mitigates flow of untreated water between a bottom of the filter bag and media facing surface 82 of plates 16, 20. Additionally and without wishing to be bound by any particular theory, it has been determined by the present disclosure that upstanding sealing rim 96 can aid in ensuring a directional flow of liquid axially upward, through bag 38 of media 18, and through system 10—particularly when media 18 is un-depleted.

In other embodiments, outer area 86 of media facing surface 82 can include a smooth surface. It has been determined by the present disclosure that the smooth surface can, when used in combination with filter bag 38 with bottom panel 102 made of elastomeric material, form an area of increased flow resistance with the filter bag 38 that mitigates flow of untreated water between a bottom of the filter bag and media facing surface 82 of plates 16, 20.

As discussed briefly above, the shape, construction, and/or material of purification media bags 38 can mitigate leakage or flow of untreated water between the outer dimension of purification media 18 and the inner surface of tank 14, and, when present, one or more expansion tubes 24. Additionally, purification media bags 38 has a shape, construction, and/or material that can mitigate leakage or flow of untreated water between the bottom of purification media 18 and the surface of first diffuser plate 16.

The features of media bag 38 alone, but particularly when combined with those present in first diffuser plate 16, provide a path of least resistance for the water to flow through the material of the purification media bags 38 instead of around the outside of the media bags.

Without wishing to be bound by any particular theory, the most basic elements of media bags 38 necessary to mitigate leakage or flow include the following. First, media bag 38 has a bottom region and top region that are porous at least at the regions of the porous inner area 88 of first and/or second diffuser plates 16, 20. Further, media bag 38 has a bottom region that is preferably seamless and formed from a resilient or elastomeric material at least in the areas of outer area 86 of first diffuser plate 16. Still further, media bag 38 has an outer region that lacks any seams that run along the entire vertical length when installed in system 10—namely from the bottom to the top of the bag. The outer region of media bag 38 that is in contact with the inner wall of system 10 is formed from a resilient or elastomeric material. It has been determined that media bag 38 having one or more of the above referenced attributes mitigate leakage or flow of untreated water around the media bag.

Various embodiments of media bags 38 are described with reference to FIGS. 12-17.

Figures 12, 13, 14:
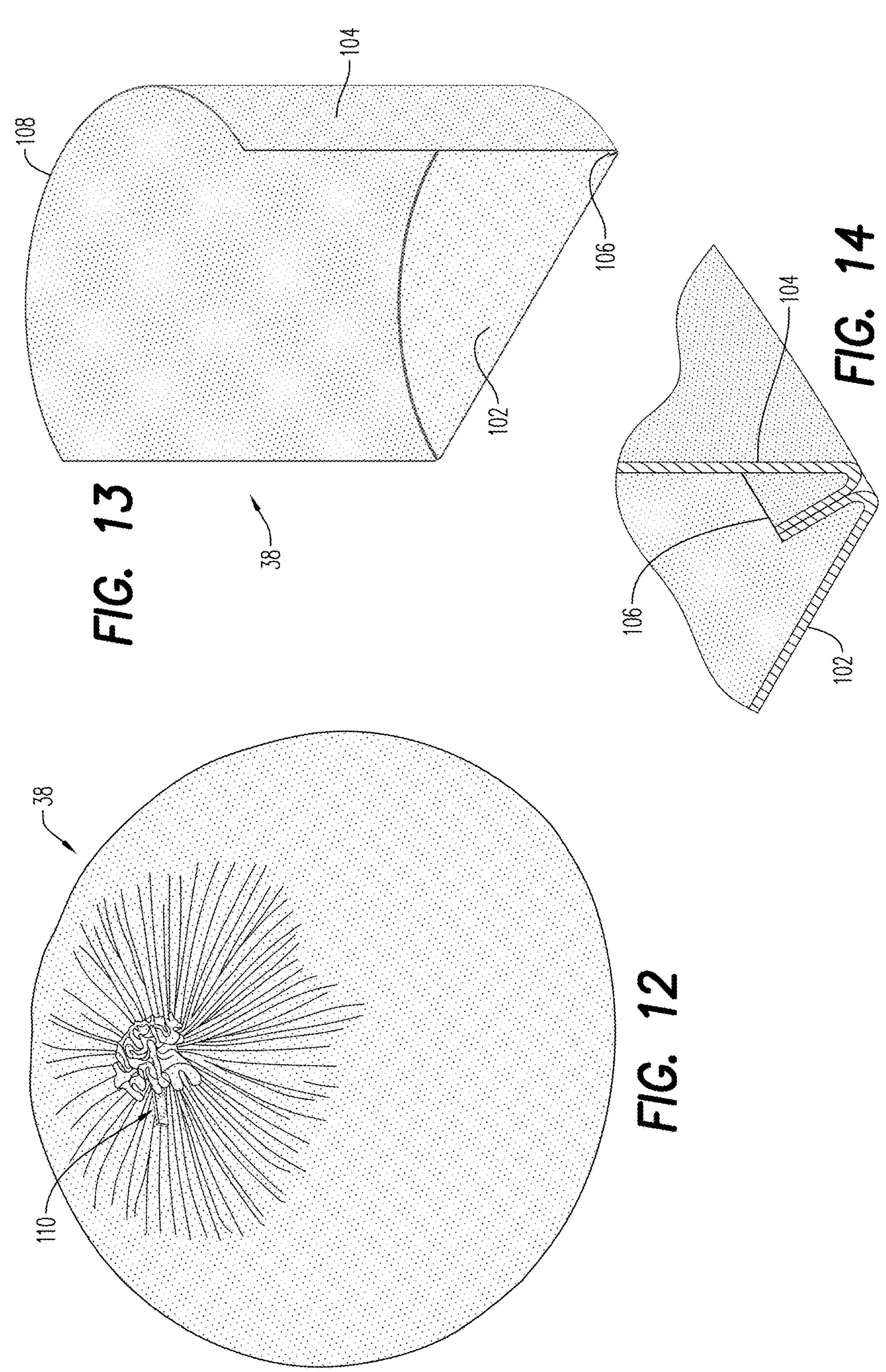
FIG. 12 is a perspective view of an exemplary embodiment of a resin bag according to the present disclosure.
FIG. 13 is a sectional view of the resin bag of FIG. 12 before filling with resin and before closing.
FIG. 14 is an enlarged view of a bottom seam of the resin bag of FIG. 13.
Figures 15, 16, 17:
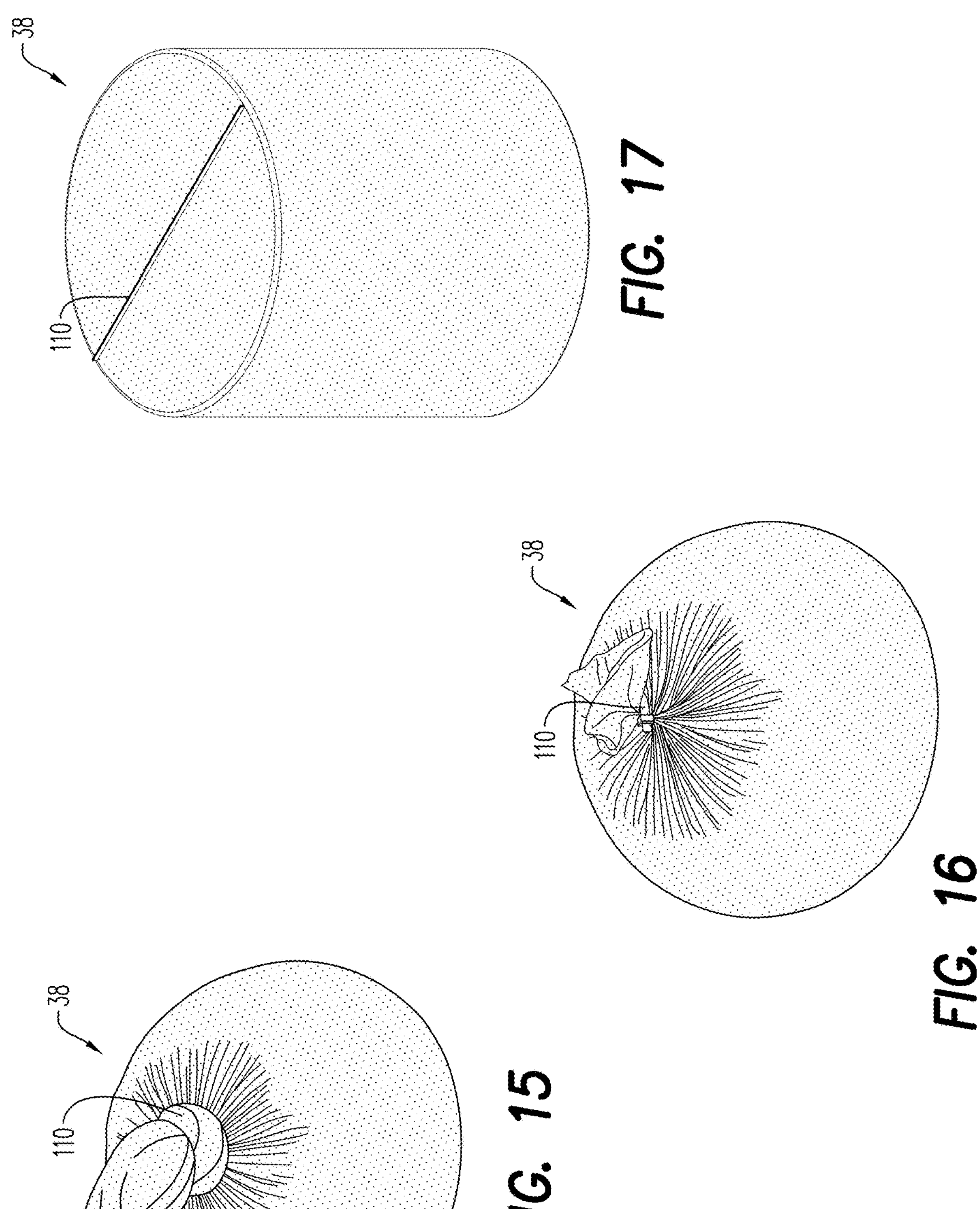
FIGS. 15-17 are perspective views of alternate exemplary embodiments of resin bags according to the present disclosure.

Media bag 38 shown in FIGS. 12-14 is made of a material that preferably conforms to the shape of the inner surface of the inner surface of tank 14 and, when present, one or more expansion tubes 24. Moreover, media bag 38 is sized and constructed so as to mitigate creases, gaps, or stiches lines vertically end-to-end along its outer perimeter to minimize the flow of water between the media bag 38 and the inner surface of tank 14. Additionally, media bag 38 is sized and constructed so as to mitigate creases, gaps, or stiches lines in the area of outer area 86 of first diffuser plate 16 to minimize the flow of water between the media bag and the diffuser plate. In some embodiments, media bag 38 is made of a resilient or elastomeric material that conforms to the first and second diffuser plates 16, 20 including upstanding rim 96.

In applications where purification media 18 includes resin, it has been determined by the present disclosure that the resin beads decrease in size or volume as they are used to purify the water. Advantageously, the resilient or elastomeric properties of bag 38 can maintain, at least in part, the media 18 in a compressed state before, during, and after use—the importance of which is described in more detail herein below.

In the illustrated embodiment, bag 38 has a circular bottom panel 102 and cylindrical wall panel 104. Panels 102, 104 are illustrated as completely seamless panels that are secured to one another along an internal seam 106. Panels 102, 104 are preferably formed of a porous material that is resilient or elastomeric and are preferably made of the same material. While panel 102 is described as circular and panel 104 is described as cylindrical, the resilient or elastomeric nature of the material of bag 38 makes such shapes preferred, but unnecessary provided that the material is sufficiently resilient or elastomeric so as to conform to the shape of first diffuser plate 16 and the inner surface of tank 14 and, when present, expansion tube 24.

In some embodiments, internal seam 106 is formed by polyester yarn (not shown). Of course, it is contemplated by the present disclosure for internal seam 106 to be any desired joining method such as, but not limited to, welds, adhesives, and others. Regardless of how formed, seam 106 is preferably provided in a manner that allows the seam to be remain elastic.

In one embodiment, bottom panel 102 and, thus, bag 38 has a normal or un-stretched outer dimension of about 180 mm, while system 10 has an inner dimension of about 200 mm. Accordingly in this embodiment, bag 38 is sized so that is stretched radially outward to sealingly engage against the inner dimension of tank 14 and expansion tubes 24, when present. Of course, it is contemplated by the present disclosure for bag 38 to have any normal or un-stretched outer dimension that is larger, the same size, or smaller than inner dimension of system 10 provided that the compression or stretch of the bag is sufficient to sealingly engage against the inner dimension of tank 14 and expansion tubes 24, when present.

Bottom panel 102 can be formed by any known knitting or woven techniques sufficient to provide the bottom panel without any seams—particularly in the region of contact between the bottom panel and outer area 86 of media facing surface 82 and upstanding rim 96.

Additionally, cylindrical wall panel 104 can be formed using known circular knitting and/or circular woven techniques so that no seams are formed at its outer periphery.

Bag 38 is preferably formed by a material at bottom panel 102 that has 15% elastane and 85% Nylon, a material at wall panel 104 that has 10% elastane and 90% Nylon, and a material at seam 106 that has 5% elastane and 95% Nylon. Of course it is contemplated by the present disclosure for bag 38 to have any desired amount of elastomeric material as is sufficient to sealingly engage or otherwise create a path of high resistance around the outer dimension of purification media 18 and the inner surface of the inner surface of tank 14 and, when present, one or more expansion tubes 24.

The resultant bag, after formation of seam 106, as has an open top end 108 through which the bag can be filled with a desired volume of resin beads (not shown) or other purification media 18. After filing with purification media 18, open top end 108 is secured by one or more closures 110. Closure 110 can be any desired closing device. In the illustrated embodiment, closure 110 is formed by one or more of zip-ties. Of course, it is contemplated by the present disclosure for closure 110 to be formed by one or more zip-ties (FIG. 12), knots (FIG. 15), metal clips (FIG. 16), welded seams (FIG. 17), sewn seams, zippers, additional panels sewn thereto, hook-and-loop type fasteners (e.g., Velcro), and any combinations thereof.

Preferably, open top end 108 is trimmed after filling and closing so that excess material above closure 110 is minimized. In some embodiments, bag 38 can include a manual assistance element, such as a loop or other handle to assist the user when removing the bag from system 10 such as a portion of the wire tie in FIG. 12 or a portion of the bag above the knot in FIG. 15.

As discussed above media bag 38 and system 10 are particularly configured to mitigate leakage or flow of untreated water around the media bag and system 10 is configured to ensure water passing through the system has sufficient residence time in contact with the purification media 18 so as to be treated to a desired level. As a result, it has been determined by the present disclosure that normal or regular fluid flow paths are established within system 10 through media 18 within bag 38. System 10 is advantageously further configured to ensure that these regular fluid flow paths through media 18 are sufficiently diffuse to maximize the contact of water with the media. Stated another way, system 10 is advantageously further configured to maximize the media 18 that is spent as a result of purifying the water, which reduces the frequency with which the operator must replace the media to attain water of the desired quality.

Without wishing to be bound by any particular theory, it is believed that compressive forces on media 18 prevents the individual beads from moving within bag 38 and/or system 10 before, during, in between uses, and after use. It is believed that maintaining of media 18 in a static or constant position within system 10, at least in part, maximizes the use or consumption of media. However, this can be made particularly difficult as it has been determined by the present disclosure that media 18, when depleted has a reduced volume. In some embodiments, media 18 can experience a reduction in volume of up to 20%—but of course more or less volume reduction is contemplated by the present disclosure. Advantageously, bag 38 is preferably formed of material sufficient to maintain media 18 under compression even after being used or spent.

Referring to FIGS. 18*a*-*g*, a resin usage test was performed with system 10 to determine the water flow through the system and, thus, to determine what portion or portions of media 18 is consumed. During the test, media 18 was a mixed bed resin of a color changing resin commercially available from Purolite® and was used in all tests. Here, fresh or un-used resin has a dark (e.g. purple) color that lightens to a light (e.g., yellow) color when depleted or used.

Water of a known particulate level, namely 110 parts per million (ppm), was fed to system 10 at a known flow rate of about 6 liters per minute. Water exiting system 10 was tested for its particulate load with the test being stopped when media 18 within the system was no longer able to provide water of a desired particulate level—in this case 20 ppm. The water flow was then stopped and system 10 was placed in a freezer to freeze the resin of media 18 in position. After frozen, system 10 was cut away to provide media 18 in a solid mass. This solid mass was then sectioned at regular intervals, namely into six intervals in FIGS. 18*b*-18*g*.

FIGS. 18a-18g are images of the resin usage test using the system of FIG. 1 with the elastomeric media bag 38 having a configuration as shown in FIG. 12 and with the diffuser plate 16 as shown in FIG. 11 that includes rim 96.

Figures 18A, 18B, 18C, 18D, 18E, 18F, 18G:
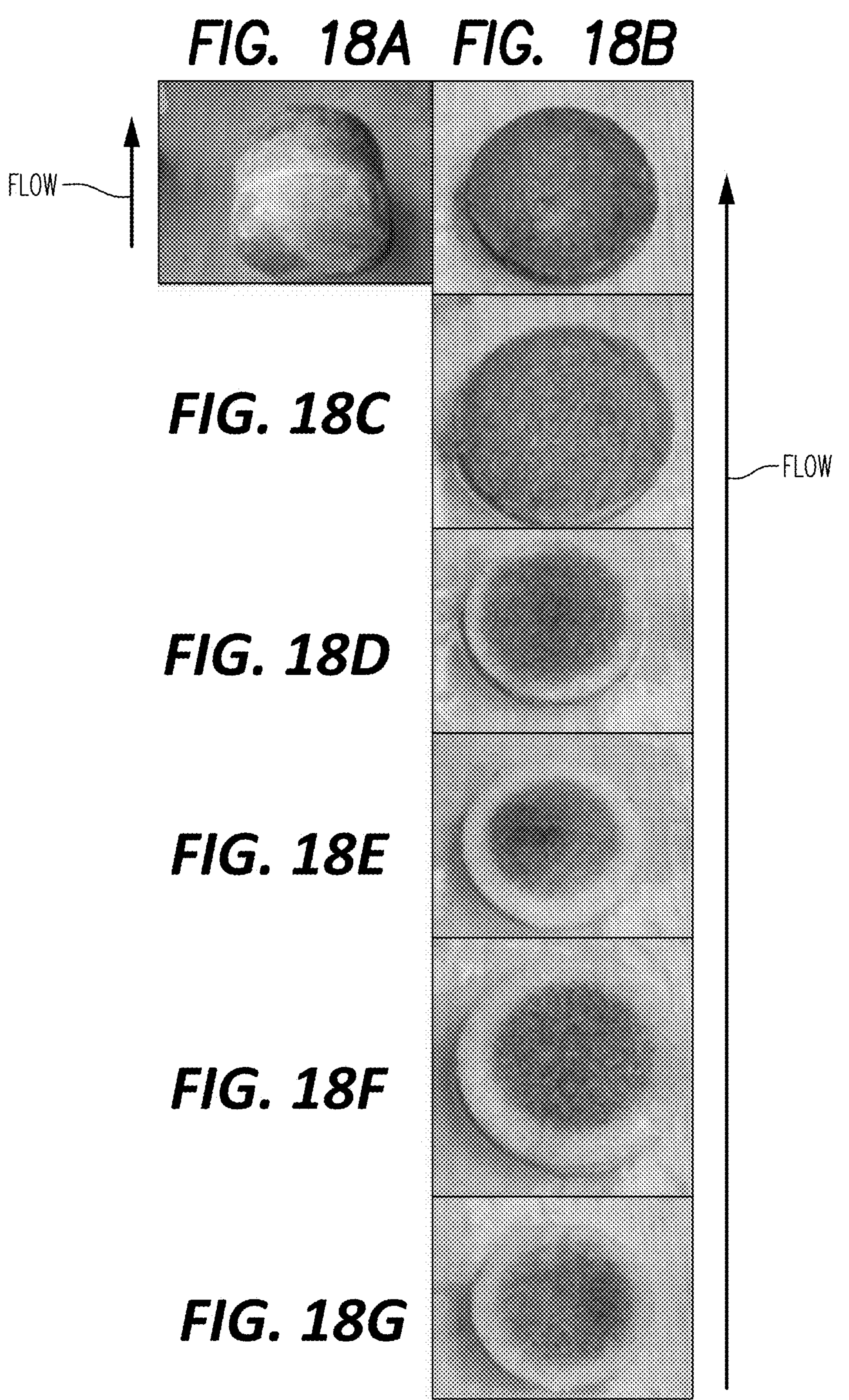
FIGS. 18*a*-18*g* are images of a first resin usage test using the system of FIG. 1.

FIG. 18a illustrates media 18 as a solid mass of frozen media 18 after completion of the test and before being sectioned. FIGS. 18b-18g and 19b-19g show the solid mass of media 18 after completion of the test and in sectioned form. Here, FIG. 18b represents sections at the top of the solid mass, namely where the test water exited the bag. Conversely, FIG. 18g represents the section of the frozen media 18 at the bottom of the solid mass, namely where the test water entered the bag. Thus, the flow direction (F) of water through media 18 during the test was from the bottom (FIG. 18g) to the top (FIG. 18b).

It can be seen that the flow pattern of water through media 18 when using diffuser plate 16 with rim 96 provides a consistent flow pattern in FIG. 18b-18g at the outer periphery of the mass as seen by the circular dark (purple) circle of unspent media throughout the center section and the light (yellow) outer rim of spent media.

Again, it has been determined by the present disclosure that the shrinkage of media 18 within system 10 can result in leakage around diffuser plate 16. Specifically, the reduced volume can also result in media 18 in bags 38 being driven or compressed—as a result of the force of the incoming water pressure—in a piston-like manner in system 10 in the direction of the water flow. When the water pressure pushes or forces bag 38 upwards in a piston like matter, the bag is forced upwards off of sealing engagement with plate 16 and rim 96, allowing water to flow between the bag and the plate towards the inner surface of tank 14.

Figure 19:
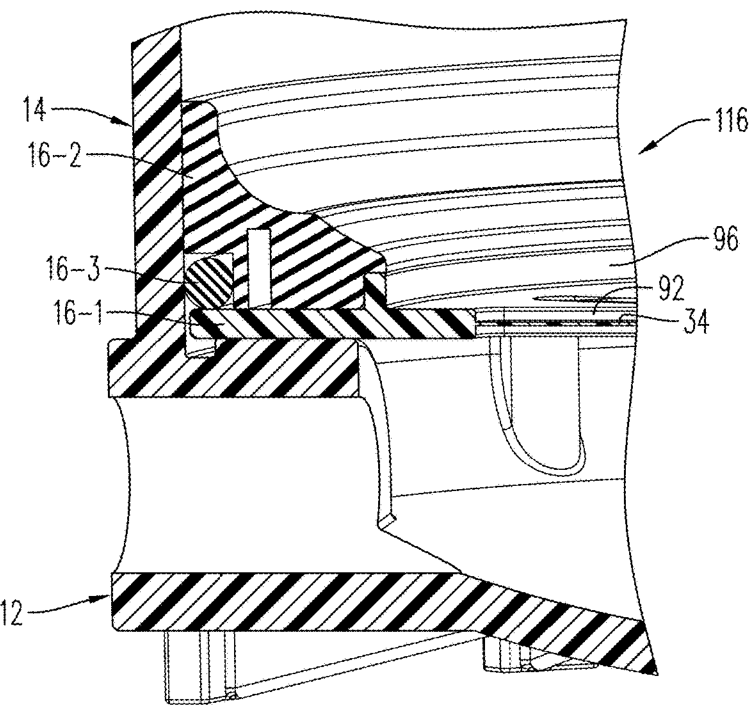
FIG. 19 is an expanded sectional view of illustrating an alternate embodiment of the pure water system of FIG. 3 having a dynamic or movable or floating diffuser plate.

Advantageously, system 10 can also be used with a dynamic diffuser plate to further improve the percent of media 18 that is utilized. FIG. 19 is an expanded sectional view of illustrating an alternate embodiment of the pure water system of FIG. 3 having a dynamic or movable or floating diffuser 116. Here, diffuser 116 is dynamic or movable or floating in that it is unsecured to tank 14. In this manner, water pressure acting on diffuser 116 forces the diffuser against the media (not shown) whether free or in a bag (not shown) to keep the diffuser pressed against the media.

In the illustrated embodiment, diffuser 116 includes diffuser plate 16-1, which is similar to diffuser 16 discussed above, and a piston portion 16-2. In some embodiments, diffuser 116 can include a seal 16-3 between diffuser plate 16-1, piston portion 16-2, and tank 14.

Piston portion 16-2 has a height tall enough to prevent diffuser 116 from tilting within in tank, but small enough to not increase friction to a point where diffuser 116 no longer moves axially within tank 14 under the force of water pressure. Similarly, seal 16-3, when present, provides sufficient sealing engagement to mitigate, and in some embodiments provides a water tight engagement to prevent, water from passing between diffuser 116 and tank 14, but does not increase friction to a point where diffuser 116 no longer moves axially within tank 14 under the force of water pressure.

Diffuser 116 is shown having piston portion 16-2 covering upstanding rim 96. Of course, it is contemplated by the present disclosure for piston portion 16-2 to allow upstanding rim 96 to protrude as discussed above.

Diffuser 116 can be tuned or adjusted to provide varying levels of pressure on the media. Specifically, diffuser 116 can be tuned by adjusting the size, shape, and position of openings 92 on plate 16-1 and/or adjusting the size, shape, and type of membrane 34. Preferably, membrane 34 at first diffuser plate 16-1 removes suspended particles having a size between about 1 micron and about 200 micron preferably 50 micron for floating diffuser 116. It has been found that membrane 34 having a size of 50 micron, the water flowing through diffuser 116 creates a force of approximately 20 pounds on the diffuser pushing against the resin bag 38.

Advantageously, diffuser 116 can be formed to retrofit prior systems 10 by merely connecting piston portion 16-2 to plate 16-1 and, when desired, adding seal 16-3.

Figure 20:
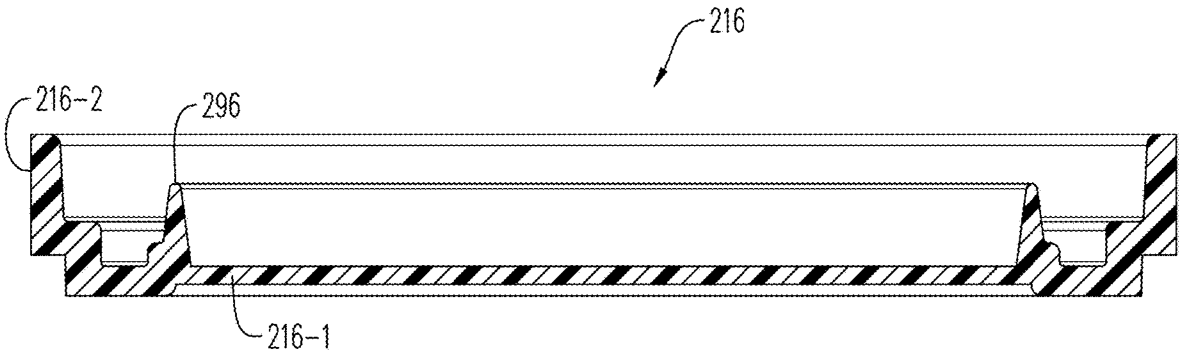
FIG. 20 is a side view of an alternate embodiment of a dynamic or movable or floating diffuser plate according to an exemplary embodiment of the present disclosure.

FIG. 20 is a side view of an alternate embodiment of a dynamic or movable or floating diffuser plate 216 according to an exemplary embodiment of the present disclosure. Again, diffuser 216—much like diffuser 116—is dynamic or movable or floating in that it is unsecured to tank 14. Thus, diffuser 216 can be forced, under the pressure of incoming water, against the media (not shown) to keep the diffuser pressed against the media.

Diffuser 216 is preferably of one-piece construction and includes first diffuser plate 216-1, which is similar to diffuser 116 discussed above and, thus, includes upstanding rim 296 and a piston portion 216-2. In some embodiments, diffuser 216 can include a seal (not shown).

Referring to FIGS. 21a-21f and 22a-22f, additional resin usage tests were also used to compare the performance of system 10 with diffuser plate 16 (FIG. 11) that is secured in place (FIGS. 21a-21f) to that with dynamic diffuser plate 116 (FIG. 19) that moves or floats due to water pressure (FIGS. 22a-22f).

As in the media usage test of FIGS. 18a-18g, media 18 was a mixed bed resin of the color changing resin and was used in both tests with fresh or un-used resin having a dark (e.g. purple) color that lightens to a light (e.g., yellow) color when depleted or used.

Here, water of a higher known particulate level, namely 400 ppm, was fed to system 10 at a known flow rate of about 6 liters per minute. Water exiting system 10 was tested for its particulate load with the test being stopped when media 18 within the system was no longer able to provide water of a desired particulate level—in this case 20 ppm. The water flow was then stopped and system 10 was placed in a freezer to freeze the resin of media 18 in position. After frozen, system 10 was cut away to provide media 18 in a solid mass. This solid mass of frozen media 18 was then sectioned at regular intervals—in this instance in five intervals.

FIGS. 21a-21f illustrate the resin usage test using the system of FIG. 1 with the elastomeric media bag 38 of FIG. 12 and the static diffuser plate 16 of FIG. 11, where the diffuser plate is secured in tank 14—namely is static. FIGS. 22a-22f illustrate the resin usage test using the system of FIG. 1 with the elastomeric media bag 38 of FIG. 12 and the diffuser 116 of FIG. 19—namely a dynamic diffuser plate.

It should be noted that the test of FIGS. 21a-21f is substantially similar to that of FIGS. 18a-18g—with the exception being that the incoming water has a higher contaminate level of 400 ppm in the test of FIGS. 21a-21f and a lower contaminate level of 110 ppm in the test of FIGS. 18a-18g.

Figures 21A, 21B, 21C, 21D, 21E, 21F:
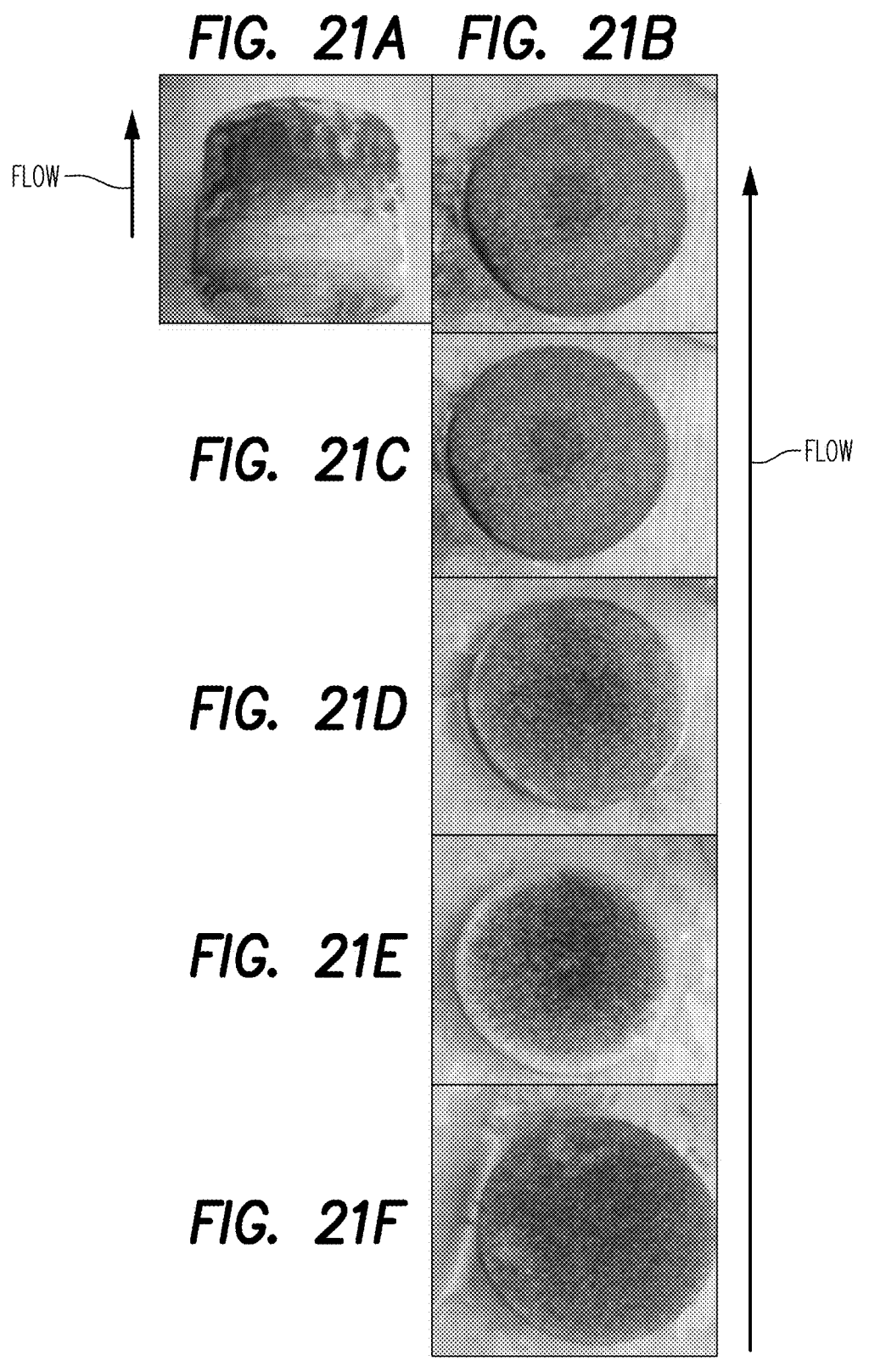
Figures 22A, 22B, 22C, 22D, 22E, 22F:
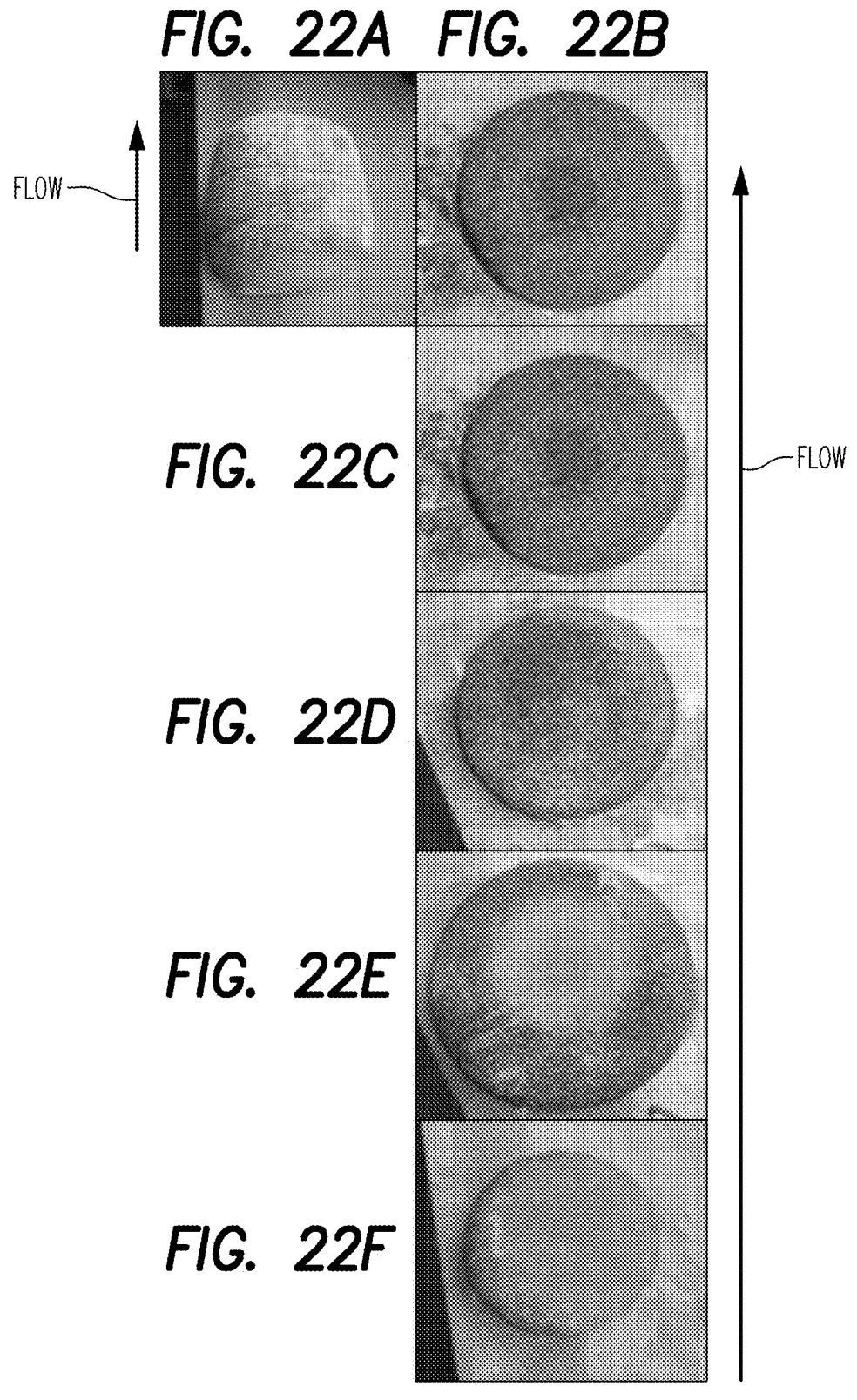

FIGS. 21a and 22a illustrate media 18 as a solid mass of media 18 after completion of the test and before being sectioned. FIGS. 21b-21f and 22b-22f show the solid mass of media 18 after completion of the test and in sectioned form. Here, FIGS. 21b and 22b represent sections at the top of the solid mass, namely where the test water exited the bag. Conversely, FIGS. 21f and 22f represent sections at the bottom of the solid mass, namely where the test water entered the bag. Thus, the flow direction (F) of water through media 18 during the test was from the bottom (FIGS. 21f and 22f) to the top (FIGS. 21b and 22b).

This comparison of media 18 in system 10 shows a noticeable performance difference between media usage and flow patterns when the diffuser is static as in FIGS. 21a-21f, as compared to when the diffuser is dynamic as in FIGS. 22a-22f.

Here, it can be seen that the flow pattern of water through media 18 having static diffuser 16 again provides a consistent flow pattern in FIGS. 21*b*-21*f* as seen by the circular dark (purple) circle of unspent media throughout the central sections and spent (light) rim of spent media at the outer rim. In comparison, it can be seen that the flow pattern of water through media 18 having dynamic diffuser 116 provides a flow pattern in FIGS. 22*b*-22*f* with significantly more spent media as seen by the light (yellow) central regions. Moreover, it can be seen that the dynamic diffuser 116 provides a flow path that is concentrated through the center mass of media 18 and at the bottom end of the mass, whereas the static diffuser plate provides a flow path that is concentrated at the periphery of the media.

Simply stated, it is believed by the present disclosure that the dynamic diffuser 116 pistons or moves due to the force of the water pressure into constant contact with bag 38 of media 18—compensating for any compression of the media and for any volume reduction of the media as a result of its depletion.

As a result, the dynamic diffuser of the present application is believed to allow more media 18 to be utilized as compared to the static diffuser 16.

Without wishing to be bound by any particular theory, the static diffuser—allows water to flow between the rim of the diffuser and the bottom of the filter bag as a result of media compression/depletion—provides a flow path that is concentrated towards the outer portion of the media. In contrast, the dynamic diffuser—mitigates water from flow between the diffuser and the bottom of the filter bag by remaining in contact with the bag and compensating for media compression/depletion—provides a flow path that is concentrated towards the central portion of the media.

Figure 23:
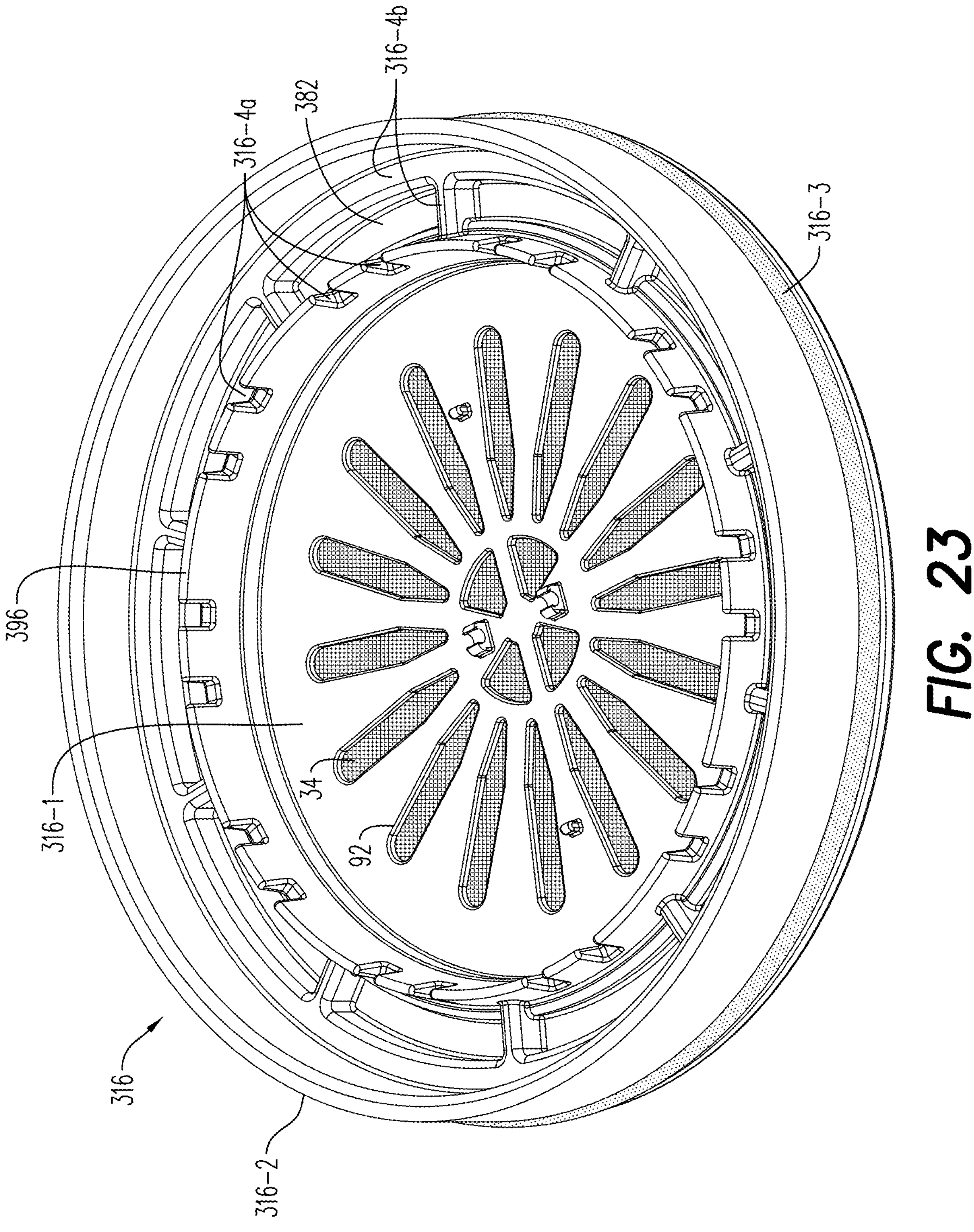
Figure 24:
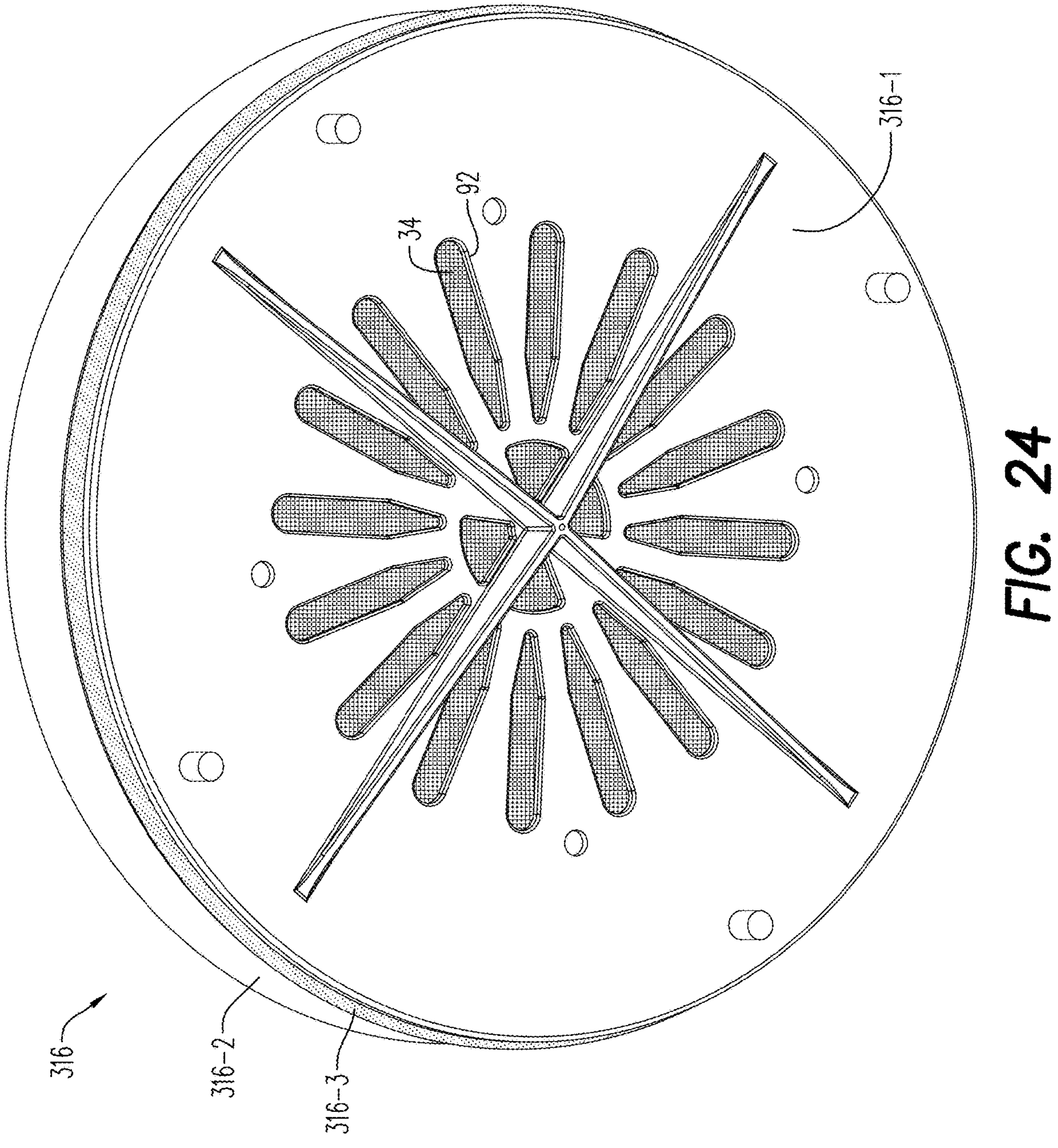
Figures 25A, 25B, 25C, 25D, 25E, 25F:
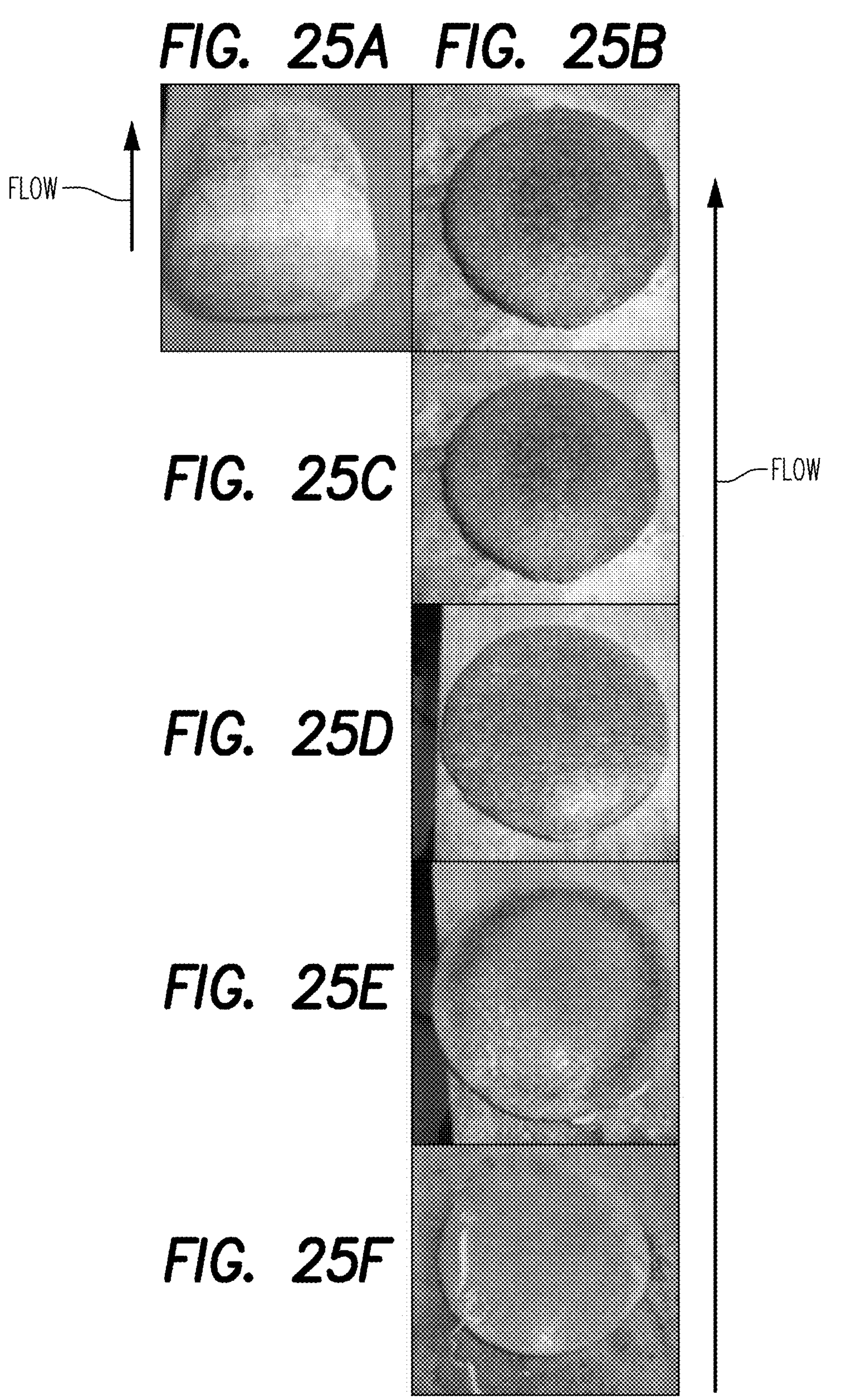

Advantageously and referring to FIGS. 23-24, system 10 can further be used with a dynamic diffuser plate 316. Diffuser 316 is dynamic or movable or floating in that it is unsecured to tank 14. In this manner, water pressure acting on diffuser 316 forces the diffuser against the media (not shown) whether free or in a bag (not shown) to keep the diffuser pressed against the media.

Diffuser 316 includes diffuser plate 316-1, which is similar to diffuser 16 discussed above and piston portion 316-2. In some embodiments, diffuser 316 can include a seal 316-3 between diffuser plate 36-1, piston portion 316-2, and tank 14. Seal 316-3 can be an O-ring as shown but is also contemplated to have any desired shape or configuration.

Here, diffuser 316 includes a having an upstanding rim 396 with a plurality of balancing features 316-4*a* and 316-4*b* that are believed to further improve the percent of media 18 that is utilized. Features 316-4*a*, 316-4*b* are configured to allow at least some portion of the water to flow past upstanding rim 396 by preventing the bag from sealing off on the rim and on media facing surface 382 of first diffuser plate 316-1. Thus although features 316-4*a* are shown as openings and features 316-4*b* are shown as ridges, it is contemplated by the present disclosure for any feature sufficient to allow the water flow to bypass rim 396 and prevent the bag 38 from sealing on surface 382 to be within the scope of the present application.

Piston portion 316-2 has a height tall enough to minimize diffuser 316 from tilting within in tank, but small enough to not increase friction to a point where diffuser 316 no longer moves axially within tank 14 under the force of water pressure. Similarly, seal 316-3, when present, provides sufficient sealing engagement to minimize or prevent water from passing between diffuser 316 and tank 14, but does not increase friction to a point where diffuser 316 no longer moves axially within tank 14 under the force of water pressure.

Diffuser 316 can be tuned or adjusted to provide varying levels of pressure on the media. Specifically, diffuser 316 can be tuned by adjusting the size, shape, and position of openings 92 on plate 16-1 and/or adjusting the size, shape, and type of membrane 34. Preferably, membrane 34 at diffuser plate 316-1 removes suspended particles having a size between about 1 micron and about 200 micron preferably 50 microns.

Diffuser 316 is shown having upstanding rim 396 with balancing features 316-4*a* and balancing features 316-4*b* on surface 382. It has been determined by the present disclosure that the number, size, type, and position of features 316-4*a* and/or 316-4*b* can be varied to balance the flow of water that is concentrated towards the outer portion of the media and the flow that is concentrated towards the central portion of the media as will be described in more detail below with respect to FIGS. 25*a*-26*f*.

FIGS. 25*a*-25*f* illustrate the resin usage test using the system of FIG. 1 with the elastomeric media bag 38 of FIG. 12 and the diffuser 316 of FIGS. 23-24—namely a dynamic diffuser plate with balancing features 316-4*a*, 316-4*b*. This additional resin usage test allows comparison of the performance of system 10 with the static diffuser plate 16 (FIGS. 21*a*-21*f*) to that with dynamic diffuser plate 116 (FIGS. 22*a*-22*f*) to that with the dynamic diffuser plate 316 with balancing features 316-4*a*, 316-4*b* (FIGS. 25*a*-25*f*).

Here, it can be seen that the flow pattern of water through media 18 having dynamic diffuser 316 provides a balanced flow pattern in FIGS. 25*b*-25*f* as seen by the reduced area of dark (purple) of unspent media and the increased area (light) of spent media. Simply stated, it is believed by the present disclosure that balancing features 316-4*a*, 316-4*b* balances the flow concentration between the central and outer regions to allow more media 18 to be utilized as compared to the static diffuser 16.

Thus, system 10 can be tuned to balance the flow of water that is concentrated towards the outer portion of media 18 and the flow that is concentrated towards the central portion of the media based, at least in part, on the number, size, type, and position of features 316-4*a*, 316-4*b*.

TABLE 1 provides another comparison of the performance of system 10 having static diffuser 16 of FIG. 11 to dynamic diffuser 316 having balancing features 316-4*a*, 316-4*b* of FIGS. 23-24.

Here, four tests were run using incoming water having total dissolved solid level of 400 ppm. Each of the four tests were run to five different total dissolved solid levels of outgoing water, namely 1 ppm, 5 ppm, 10 ppm, 15 ppm, and 20 ppm. All four tests were run using bag 38 having media 18 therein. The results in TABLE 1 for each of the four tests represent an average of three runs.

Test 1 and Test 2 were run using system 10 shown in FIG. 1 that has only tank 14—where Test 1 used the static diffuser of FIG. 11 and Test 2 used the dynamic diffuser 316 of FIG. 23.

Figure 4:
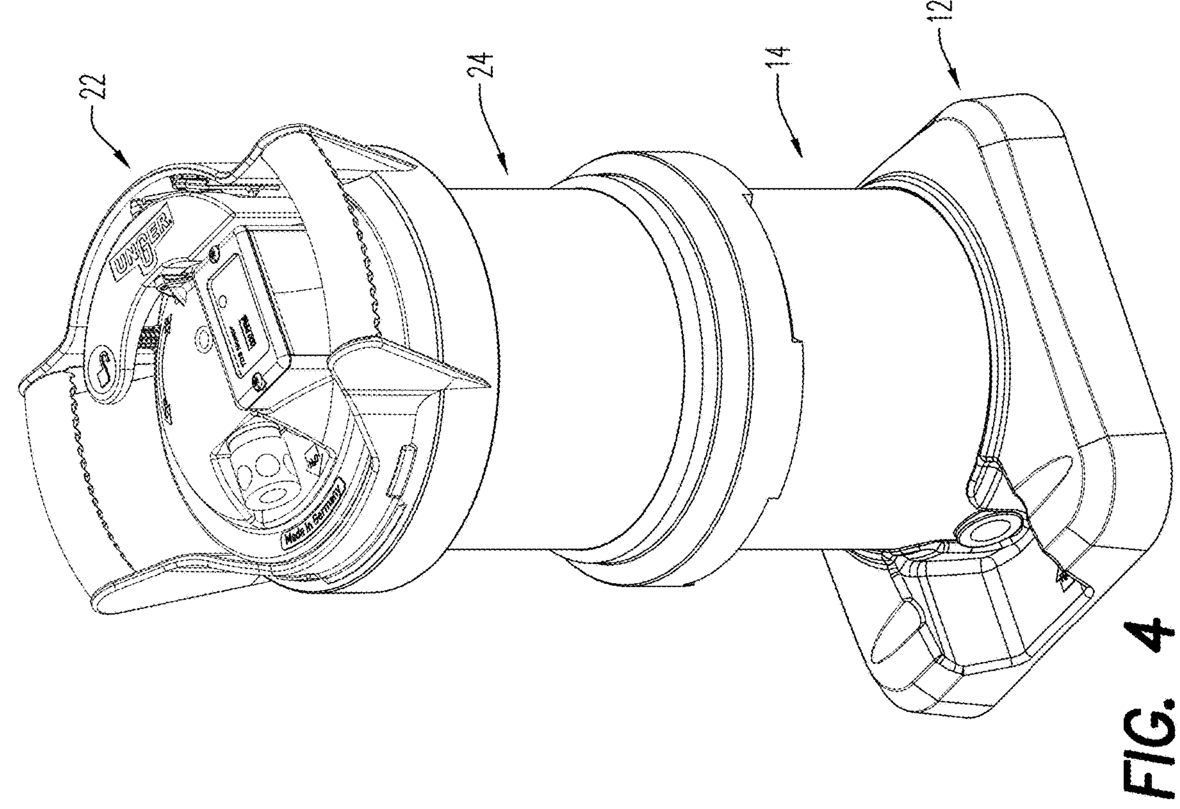
FIG. 4 is a top perspective views of the pure water system of FIG. 1 having one expansion tube installed.
Figure 6:
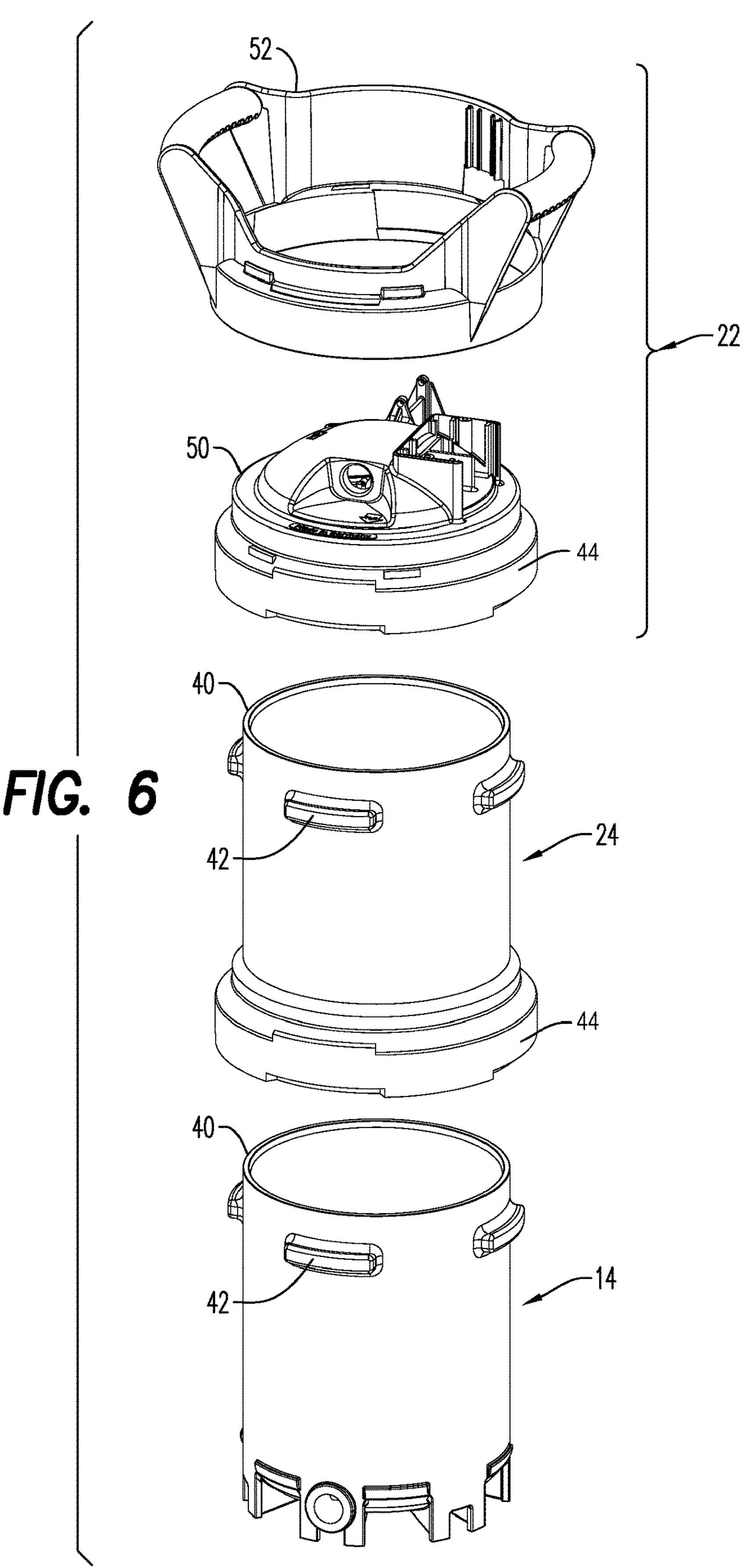
FIG. 6 is a partial exploded view of the pure water system of FIG. 4.

Test 3 and Test 4 were run using system 10 shown in FIG. 4 that has both tank 14 and one expansion tube 24—where Test 3 used the static diffuser of FIG. 11 and Test 4 used the dynamic diffuser 316 of FIG. 23.

TABLE 1

| Water in (ppm) | Water out (ppm) | Test 1 Static diffuser in FIG. 11 and system in FIG. 1 (liters) | Test 2 Dynamic diffuser in FIG. 23 and system in FIG. 1 (liters) | Test 3 Static diffuser in FIG. 11 and system in FIG. 4 (liters) | Test 4 Dynamic diffuser in FIG. 23 and system in FIG. 4 (liters) |
|---|---|---|---|---|---|
| 400 | 1 | 117 | 294 | 487 | 631 |
| 400 | 5 | 225 | 330 | 626 | 687 |
| 400 | 10 | 260 | 344 | 668 | 720 |
| 400 | 15 | 286 | 355 | 684 | 736 |
| 400 | 20 | 300 | 365 | 696 | 746 |

From Test 1 it can be seen that system 10 when using static diffuser 16 of FIG. 11 provides 117 liters of outgoing water at 1 ppm from incoming water at 400 ppm, whereas system 10 provides 294 liters in Test 2 when using the dynamic diffuser 316 of FIG. 23. Thus, the dynamic diffuser of the present application, when used with media 18 in bags 38, provides better utilization of the media to result in higher amounts of water being provided at the desired outgoing total dissolved solid levels. Similar results can be seen from a comparison of Test 3 and Test 4.

Figure 26:
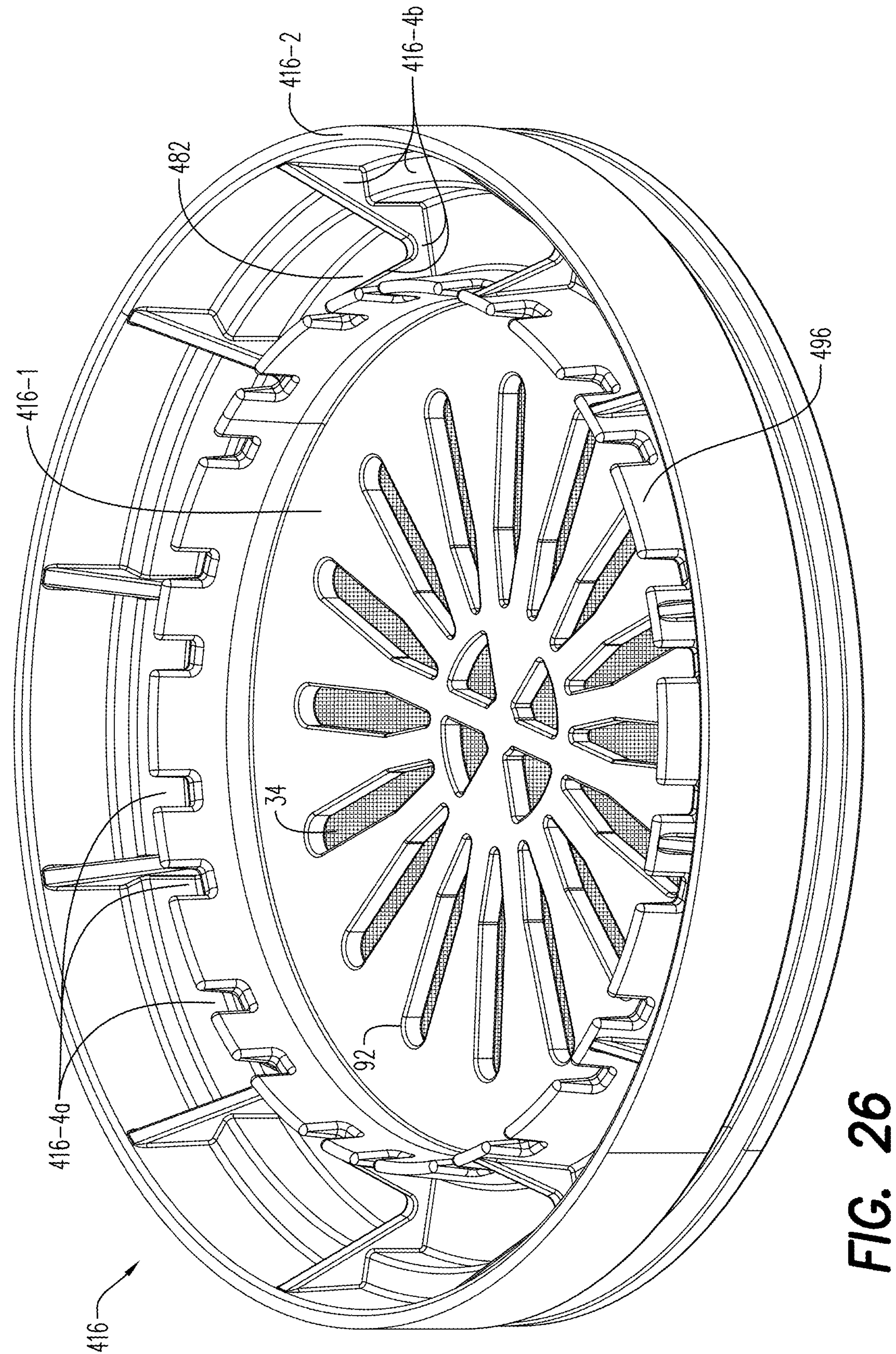
FIG. 26 is a top perspective view of yet another alternate embodiment of a dynamic or movable or floating diffuser plate according to an exemplary embodiment of the present disclosure.

Turning now to FIG. 26 another exemplary embodiment of a dynamic diffuser 416 having an upstanding rim 496 with balancing features **416-4*a*, 416-4*b* is shown. Diffuser 416 is an integral one-piece unit in which diffuser plate 416-1, piston portion 416-2, features 416-4*a*, 416-4*b*, and membrane 34** are unitarily molded into an integral unit.

It should be recognized that the various embodiments of first diffuser plate 16 from FIG. 3 have been disclosed as being the dynamic diffusers 116, 216, 316, 416 positioned at the bottom of bag 38 when the flow direction is from the bottom to the top. Of course, it is contemplated by the present disclosure for the second diffuser plate 20 of FIG. 3 to also be a dynamic plate as disclosed herein either together with a dynamic or static first diffuser plate and/or with a flow direction from the top to the bottom.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A water filter system comprising:

a tank having an inner surface, a first port, and a first reservoir, the tank defining a single chamber configured to receive water flow from the first port and the first reservoir;

a cover assembly removably attachable to and forming a fluid tight connection with the tank when attached to the tank, the cover assembly having a second reservoir and a second port to receive the water flow from the single chamber;

a base;

one or more wheels operably coupled to the base and configured to allow movement of the water filter system during use; and a single porous filter bag having a purification media disposed therein, the single porous filter bag being positioned in the single chamber and engaging the inner surface of the tank between the base and the cover assembly, wherein the porous filter bag is made from a material that maintains the purification media under compression and operable to purify water after a 20% reduction in volume of the purification media due to use of the purification media for purification of the water flow through the single chamber, wherein the cover assembly comprises a handle and a release assembly and wherein the release assembly comprises a pressure releasing plunger and a pivot lever movable between a first position and a second position, wherein when transitioning from the first position to the second position the pressure releasing plunger is configured to vent pressure from the tank and a locking arm is withdrawn from a slot to unlock the cover assembly from the tank, the handle of the cover assembly being positioned proximate an end of the pivot lever such that the handle shields fluid spray that results from said venting of the pressure.

2. The water filter system of claim 1, further comprising:

a diffuser plate disposed within the tank, the diffuser plate having an inner area, an outer area surrounding the inner area, and a plurality of fluid passage openings extending solely within the inner area.

3. The water filter system of claim 2, wherein the purification media comprises deionizing resin.

4. The water filter system of claim 3, wherein the purification media comprises deionizing resin comprises at least one of mixed bed, weak base anion, weak acid cation, strong base anion, and strong acid cation.

5. The water filter system of claim 2, further comprising mesh covering the plurality of fluid passage openings.

6. The water filter system of claim 2, wherein the outer area is at least sealingly engaged with the inner surface of the tank.

7. The water filter system of claim 2, wherein the diffuser plate is secured in the tank or is movable within the tank.

8. The water filter system of claim 2, wherein the porous filter bag comprises an outer wall panel that is a cylindrical tube and a bottom panel.

9. The water filter system of claim 8, wherein the outer wall panel is secured to the bottom panel by an internal seam and has a closure on an open end of the outer wall panel.

10. The water filter system of claim 8, wherein the bottom region of the porous filter bag is defined by the bottom panel.

11. The water filter system of claim 2, wherein the base is integrally formed with the tank.

12. The water filter system of claim 2, wherein the diffuser plate further includes a media facing surface, the media facing surface having a sealing rim configured to engage the single porous filter bag to guide the water flow into the single porous filter bag.

13. The water filter system of claim 12, wherein the sealing rim is disposed radially outward from the plurality of fluid passage openings.

14. The water filter system of claim 1, wherein the single porous filter bag includes a manual assistance element to assist a user when removing the porous filter bag from the tank.

15. The water filter system of claim 14, wherein the porous filter bag has a bottom region that is seamless.

16. The water filter system of claim 15, wherein the bottom region that is seamless is arranged at least in areas where the porous filter bag engages to the diffuser plate.

* * * * *